US012631660B2

(12) United States Patent
Simmons

(10) Patent No.: US 12,631,660 B2
(45) Date of Patent: May 19, 2026

(54) RECIRCULATION OF A SAMPLE FLUID FOR ANALYSIS IN A MICROFLUIDIC DEVICE

(71) Applicant: NEW YORK UNIVERSITY, New York, NY (US)

(72) Inventor: Glennon W. Simmons, Robbinsville, NJ (US)

(73) Assignee: New York University, New York, NY (US)

( * ) Notice: Subject to any disclaimer, the term of this patent is extended or adjusted under 35 U.S.C. 154(b) by 256 days.

(21) Appl. No.: 18/001,157

(22) PCT Filed: Jun. 11, 2021

(86) PCT No.: PCT/US2021/036951
§ 371 (c)(1),
(2) Date: Dec. 8, 2022

(87) PCT Pub. No.: WO2021/252856
PCT Pub. Date: Dec. 16, 2021

(65) Prior Publication Data
US 2023/0213544 A1 Jul. 6, 2023

Related U.S. Application Data

(60) Provisional application No. 63/037,967, filed on Jun. 11, 2020.

(51) Int. Cl.
*G01N 35/10* (2006.01)
*B01L 3/00* (2006.01)
*G01N 35/00* (2006.01)

(52) U.S. Cl.
CPC ...... *G01N 35/1009* (2013.01); *B01L 3/50273* (2013.01); *G01N 35/00029* (2013.01);
(Continued)

(58) Field of Classification Search
None
See application file for complete search history.

(56) References Cited

U.S. PATENT DOCUMENTS

2008/0025872 A1* 1/2008 Dykes .............. A61B 5/150229
422/68.1
2011/0290669 A1 12/2011 Davis
(Continued)

FOREIGN PATENT DOCUMENTS

EP 1893739 A2 3/2008
WO WO-2020031089 A1 * 2/2020 ........ B01L 3/502715

OTHER PUBLICATIONS

2019 Mining Health and Safety Conference, Drager DrugTest 5000, Apr. 11, 2019 (29 pp).
(Continued)

*Primary Examiner* — Eric S. McCall
*Assistant Examiner* — Nigel H Plumb
(74) *Attorney, Agent, or Firm* — Riverside Law LLP

(57) ABSTRACT

The present invention provides devices and methods for generating a pulsatile fluid flow in a microchannel by means of external actuation of a thin flexible film. With the devices described herein, cycles of positive and negative actuation can be used to infuse or withdrawal fluid in a microchannel. Fluid can be recirculated over one or more microfluidic feature, such as a chemical or molecular receptor, biosensor, electrode, cell or biological material, chromatography feature, mixer, etc., in a way that would represent an advantage over the single-pass flow techniques common to most microfluidic devices. The devices and methods are particularly useful in vitro diagnostics (IVD), analytical chemistry, chromatography, and mixing applications in a variety of fields.

22 Claims, 19 Drawing Sheets

(52) U.S. Cl.
CPC ..... *B01L 2200/025* (2013.01); *B01L 2200/16*
(2013.01); *B01L 2300/0636* (2013.01); *B01L*
*2400/0406* (2013.01); *B01L 2400/0481*
(2013.01); *B01L 2400/0677* (2013.01); *G01N*
*2035/1034* (2013.01)

(56) References Cited

U.S. PATENT DOCUMENTS

| | | | | |
|---|---|---|---|---|
| 2012/0190128 | A1 | 7/2012 | Nikbakht | |
| 2015/0060272 | A1* | 3/2015 | Blidner | G01N 33/5438 |
| | | | | 204/403.01 |
| 2015/0247845 | A1* | 9/2015 | Heller | G01N 33/54333 |
| | | | | 435/7.1 |
| 2015/0298118 | A1 | 10/2015 | Chard | |
| 2017/0036207 | A1* | 2/2017 | Wright | B01F 27/0721 |
| 2017/0113221 | A1 | 4/2017 | Hoffman | |

OTHER PUBLICATIONS

A. G. Verstraete, Rosita-2 Project Final Report, 2006. 212 pages.
Angela R. Dixon, Shrinidhi Rajan, Chuan-Hsien Kuo, Tom Bersano, Rachel Wold, Nobuyuki Futai, Shuichi Takayama, Geeta Mehta; Microfluidic device capable of medium recirculation for non-adherent cell culture. Biomicrofluidics Jan. 1, 2014; 8 (1): 016503. 14 pages.
Extended European Search Report issued in App. No. EP21820993, dated Aug. 20, 2024, 13 pages.
Garcia-Cordero, J.L., Basabe-Desmonts, L., Ducrée, J. et al. Liquid recirculation in microfluidic channels by the interplay of capillary and centrifugal forces. Microfluid Nanofluid 9, 695-703 (2010). https://doi.org/10.1007/s10404-010-0585-4.
Gonzalez-Sapienza G, Rossotti MA, Tabares-da Rosa S. Single-Domain Antibodies as Versatile Affinity Reagents for Analytical and Diagnostic Applications. Front Immunol. Aug. 21, 2017;8:977. doi: 10.3389/fimmu.2017.00977. PMID: 28871254; PMCID: PMC5566570. 12 pages.
Henry KA and MacKenzie CR (2018) Editorial: Single-Domain Antibodies—Biology, Engineering and Emerging Applications. Front. Immunol. 9:41. 4 pages. doi: 10.3389/fimmu.2018.00041.
Li G, Brady JE, Chen Q. Drug use and fatal motor vehicle crashes: a case-control study. Accid Anal Prev. Nov. 2013;60:205-10. doi: 10.1016/j.aap.2013.09.001. Epub Sep. 8, 2013. PMID: 24076302. 6 pages.
M. S. Horst Schulze, Raschid Urmeew, Kerstin Auerbach, (all—Federal Highway Research Institute, (BASt), Germany), DRUID Study Final Report, 2006. 96 pages.
Posthuma-Trumpie GA, Korf J, van Amerongen A. Lateral flow (immuno)assay: its strengths, weaknesses, opportunities and threats. A literature survey. Anal Bioanal Chem. Jan. 2009;393(2):569-82. doi: 10.1007/s00216-008-2287-2. Epub Aug. 13, 2008. PMID: 18696055.
Wang, et al, UniChip enables long-term recirculating unidirectional perfusion with gravity-driven flow for microphysiological systems, Lab Chip, 2018, 18, 2563-2574.
Wille SM, Samyn N, Ramírez-Fernandez Mdel M, De Boeck G. Evaluation of on-site oral fluid screening using Drugwipe-5(+), RapidSTAT and Drug Test 5000 for the detection of drugs of abuse in drivers. Forensic Sci Int. May 20, 2010;198(1-3):2-6. doi: 10.1016/j.forsciint.2009.10.012. Epub Nov. 12, 2009. PMID: 19913376.

* cited by examiner

FIG. 17A
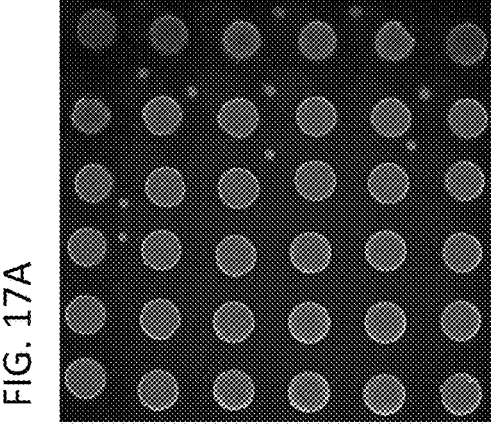
FIG. 17B
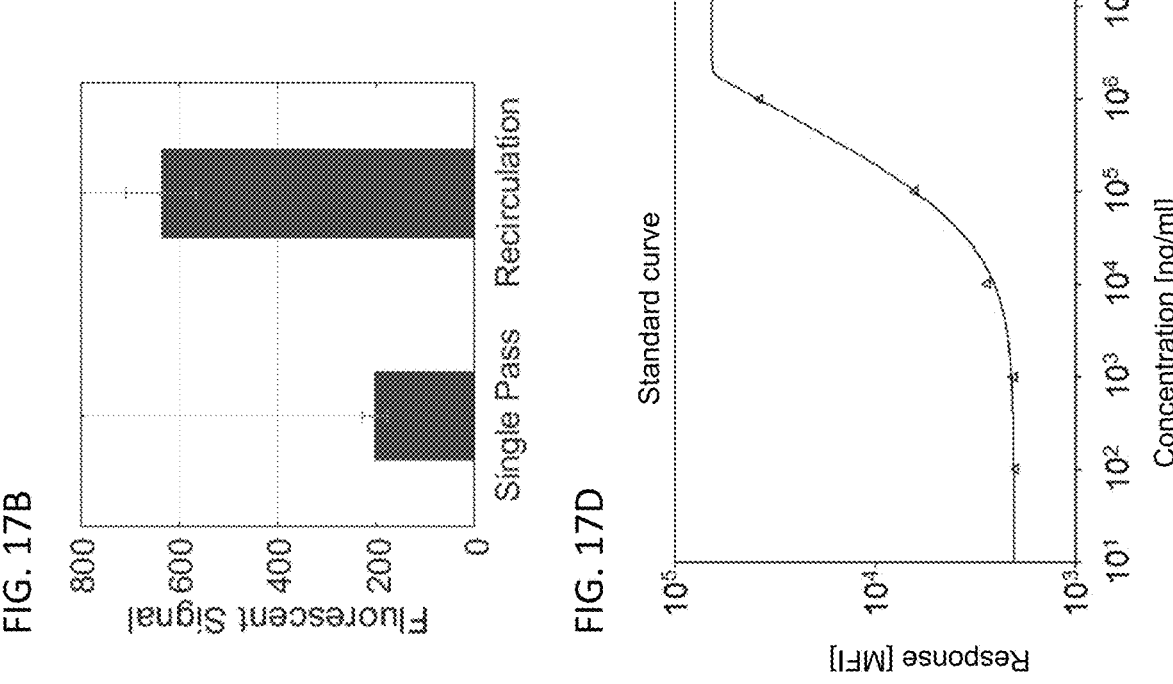
FIG. 17C
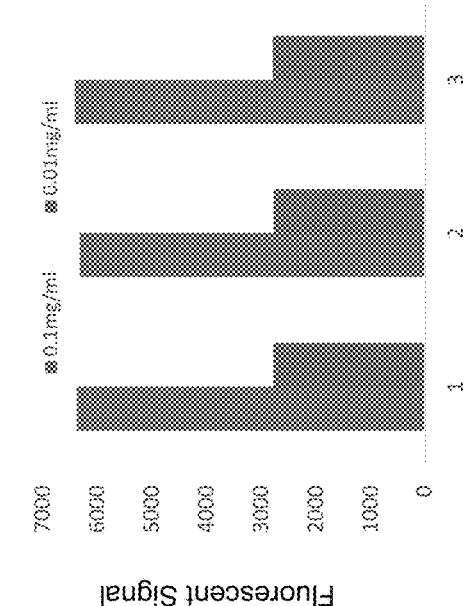
FIG. 17D

RECIRCULATION OF A SAMPLE FLUID FOR ANALYSIS IN A MICROFLUIDIC DEVICE

CROSS-REFERENCE TO RELATED APPLICATIONS

This application is the U.S. national phase application filed under 35 U.S.C. § 371 claiming benefit to International Patent Application No. PCT/US2021/036951 filed on Jun. 11, 2021, which is entitled to priority to U.S. Provisional Patent Application No. 63/037,967, filed Jun. 11, 2020, each of which is incorporated by reference herein in its entirety.

BACKGROUND OF THE INVENTION

Microfluidic systems are used to control fluid motion in channels with dimensions of tens of microns. Lab-on-a-Chip (LOC) systems couple microfluidic channels and fluid handling elements with integrated sensors to automate complex multistep chemical analysis protocols in a single device. LOC devices have numerous advantages over their large-scale counterparts, including minimal sample and reagent consumption, decreased operational cost, and faster analysis times. LOC devices have the potential to extend the use of advanced analytical tools to field-based users through increased automation and portability.

Flow tends to be laminar in microfluidic devices and spontaneous fluctuations of velocity that tend to homogenize fluids are absent. Under laminar conditions, adjacent fluid layers flow parallel to one another in smooth straight trajectories. Mixing is purely diffusive under such conditions. Fluid flow inside microfluidic channels is typically supplied by pressure drive or passive means, limited to one-way or unidirectional flow format delivered in a single pass. This limits the molecules that can be collected by an affinity surface to those that can diffuse to the sensor during a set time. Molecules in adjacent fluid propagating down a channel toward a sensor are essentially lost to waste without interacting with the sensor. In order to collect these molecules, the flow rate can be reduced to allow for sufficient time for diffusion to occur. However, this is at the cost of overall time. Technological solutions are generally sought after to reduce total test time, sometimes referred to as sample-to-answer time, where additional time could be a distinct disadvantage.

Thus, there is a need in the art for devices and methods that feature fluid recirculation for improved sample processing and analyte detection.

SUMMARY OF THE INVENTION

In one aspect, the present disclosure relates to a fluid recirculating cartridge device, comprising: a cartridge body; a central chamber embedded in the cartridge body; at least one microchannel embedded in the cartridge body, the at least one microchannel being fluidly connected at a proximal end to the central chamber; at least one sensor region embedded in the cartridge body, each of the at least one sensor region being positioned on a fluid path of the at least one microchannel; a waste reservoir embedded in the cartridge body, the waste reservoir being fluidly connected to a distal end of the at least one microchannel; and an actuating chamber embedded in the cartridge body, wherein the actuating chamber is fluidly connected to the waste reservoir and comprises an externally depressible flexible membrane.

In one embodiment, the fluid connection between the proximal end of the at least one microchannel and the central chamber comprises a passive valve. In one embodiment, each of the at least one sensor region comprises an array of sensor spots, each sensor spot comprising at least one capture molecule or probe. In one embodiment, the capture molecule or probe is selected from the group consisting of: antibodies, antibody fragments, antigens, proteins, nucleic acids, oligonucleotides, peptides, lipids, lectins, inhibitors, activators, ligands, hormones, cytokines, sugars, amino acids, fatty acids, phenols, and alkaloids. In one embodiment, each sensor spot is about 100 μm in diameter and is arranged in a circular array with a pitch of about 200 μm and a diameter of about 3 mm.

In one embodiment, the at least one hermetically sealed fluid chamber embedded in the cartridge body, wherein the seal of each fluid chamber is configured to be breakable to fluidly connect each fluid chamber to the central chamber by a microchannel. In one embodiment, each fluid chamber comprises a liquid selected from a wash buffer, water, or a reagent. In one embodiment, the device further comprises a reagent chamber positioned on a fluid path between a fluid chamber and the central chamber. In one embodiment, the reagent chamber comprises a liquid or a solid-state reagent.

In one embodiment, the central chamber is configured to receive a liquid sample. In one embodiment, the at least one microchannel is configured to draw the liquid sample towards the at least one sensor region by capillary action. In one embodiment, the actuating chamber is configured to recirculate the liquid sample over the at least one sensor region upon depressing and releasing the flexible membrane.

In one embodiment, the cartridge body has a planar shape with a length between about 50 mm and 150 mm, a width between about 50 mm and 150 mm, and a thickness between about 1 mm and 10 mm. In one embodiment, the length is about 75 mm, the width is about 26 mm, and the thickness is about 1.6 mm.

In another aspect, the present disclosure relates to a cartridge reader device, comprising: an external housing; a screen mounted on the external housing; a cartridge port sized to receive the cartridge of the present disclosure; and an internal mount; wherein the internal mount comprises at least one stepper motor and at least one optical sensor.

In one embodiment, the cartridge port comprises lateral springs configured to align an inserted cartridge such that an actuating chamber of the cartridge is aligned with the at least one stepper motor and at least one sensor region of the cartridge is aligned with the at least one optical sensor. In one embodiment, the at least one stepper motor is configured to depress and release a flexible membrane of an aligned actuating chamber. In one embodiment, the internal mount further comprises at least one solenoid. In one embodiment, the cartridge port comprises lateral springs configured to align an inserted cartridge such that at least one fluid chamber is aligned with the at least one solenoid. In one embodiment, the at least one solenoid is configured to break a hermetic seal of the at least one fluid chamber.

In another aspect, the present disclosure relates to a method of recirculating fluids, comprising the steps of: dispensing a sample fluid such that it flows into a microchannel; and performing at least one actuation of a membrane of a chamber fluidly connected to the microchannel; wherein the at least one actuation of the membrane passes the sample fluid over at least one sensor region positioned in a fluid path of the microchannel.

In another aspect, the present disclosure relates to a squeeze bulb cartridge device, comprising: a cartridge body;

a microchannel embedded in the cartridge body, the at least one microchannel being fluidly connected at a proximal end to a squeezable bulb and at a distal end to a distal port; and at least one sensor region embedded in the cartridge body, each of the at least one sensor region being positioned on a fluid path of the at least one microchannel; wherein a length of the microchannel has a winding path forming a flow restrictor region configured to reduce a flow of fluid within the microchannel.

BRIEF DESCRIPTION OF THE DRAWINGS

The following detailed description of exemplary embodiments will be better understood when read in conjunction with the appended drawings. It should be understood, however, that the disclosure is not limited to the precise arrangements and instrumentalities of the embodiments shown in the drawings.

FIG. 17A through FIG. 17D depict the results of preliminary data collected on a prototype system. (FIG. 17A) The data image shows the signal response for a 6×6 array configured with mouse IgG antibody detected with a labeled anti-mouse secondary antibody for a 1-minute assay. (FIG. 17B) Bar graphs show significant benefit of recirculation of sample to improve signal intensity. (FIG. 17C) Bar graphs shows excellent within run precision (n=3) for 0.1 and 0.01 mg/ml mouse IgG antibody. (FIG. 17D) A standard curve for mouse IgG antibody assay shows excellent fit to a 4-parameter logistic regression with 4 log range.

(FIG. 18C) A precision study shows excellent repeatability of the tracer blank with 10.2% coefficient of variance.

DETAILED DESCRIPTION

Figure 1:
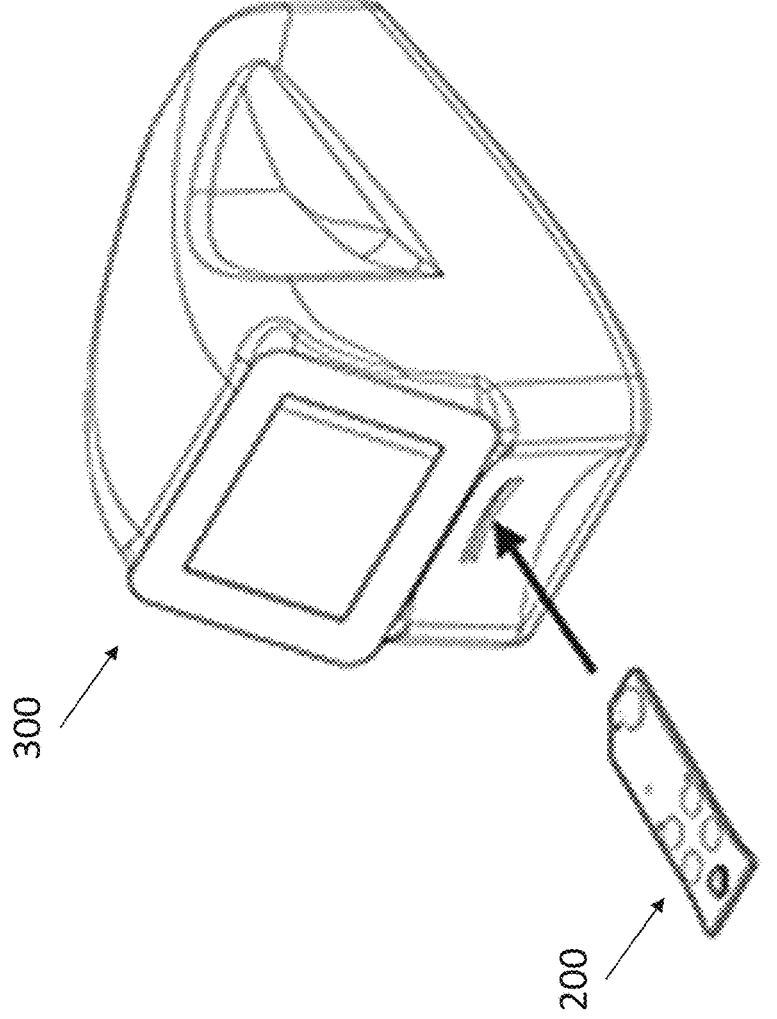
FIG. 1 depicts an exemplary fluid recirculation and analyte detection system.

The present disclosure provides devices and methods for generating a pulsatile fluid flow in a microchannel by means of external actuation of a thin flexible film. With the devices described herein, cycles of positive and negative actuation can be used to infuse or withdrawal fluid in a microchannel. Fluid can be recirculated over one or more microfluidic feature, such as a chemical or molecular receptor, biosensor, electrode, cell or biological material, chromatography feature, mixer, etc., in a way that would represent an advantage over the single-pass flow techniques common to most microfluidic devices. The devices and methods are particularly useful in vitro diagnostics (IVD), analytical chemistry, chromatography, and mixing applications in a variety of fields.

Definitions

The figures and descriptions of the present disclosure illustrate elements that are relevant for a clear understanding, while eliminating, for the purpose of clarity, certain other elements. The disclosure herein is intended to include variations and modifications to elements and methods as described herein.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects are presented in a range format. It should be understood that the description in range format is merely for convenience and brevity and should not be construed as an inflexible limitation on the scope of the disclosure. Accordingly, the description of a range is intended to include possible subranges as well as individual numerical values.

Fluid Recirculating Cartridge

The present disclosure provides devices and methods that employ recirculation of fluids. The devices and methods are particularly useful in in vitro diagnostics (IVD), analytical chemistry, chromatography, and mixing applications in a variety of fields. The devices and methods also have utility in clinical chemistry, drug discovery, personalized medicine, medication adherence monitoring, companion diagnostics, drugs of abuse testing, food and beverage testing, water monitoring, chemical and biological defense, infectious disease, and veterinary testing. In some embodiments, the devices and methods can be used as a next generation drug portable toxicology testing device for roadside drug screening as a tool to obtain legal evidence of driving under the influence of drugs (DUID). In certain aspects, the devices described herein represent the core component of a test system that includes sample kits, disposable test cartridges, portable instruments, video cameras, software, an associated app, and a cloud based server.

Referring now to FIG. 1, an exemplary fluid recirculation and analyte detection system 100 is depicted. System 100 comprises at least one cartridge 200 and a reader 300. As described elsewhere herein, the at least one cartridge 200 receives a fluid sample and passes the fluid sample multiple times over a microfluidic feature, such as at least one sensor, for the detection of one or more analytes through the actuation of a thin flexible membrane fluidly connected to one or more microchannels. Reader 300 can receive the at least one cartridge 200 to automate the recirculation of fluids and to carry out analyte detection and data processing.

Figure 2:
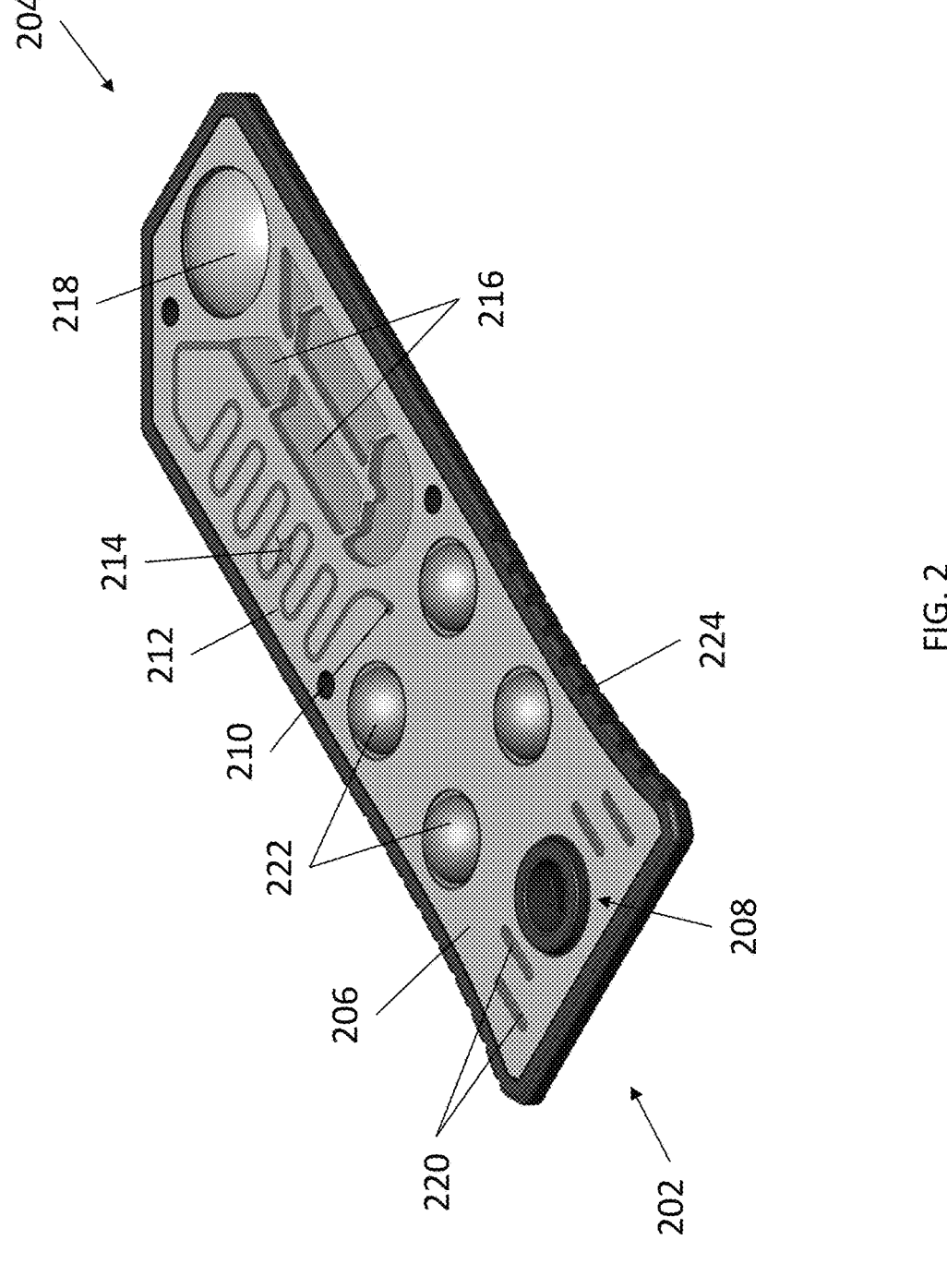
FIG. 2 depicts a perspective view of an exemplary cartridge.
Figure 3:
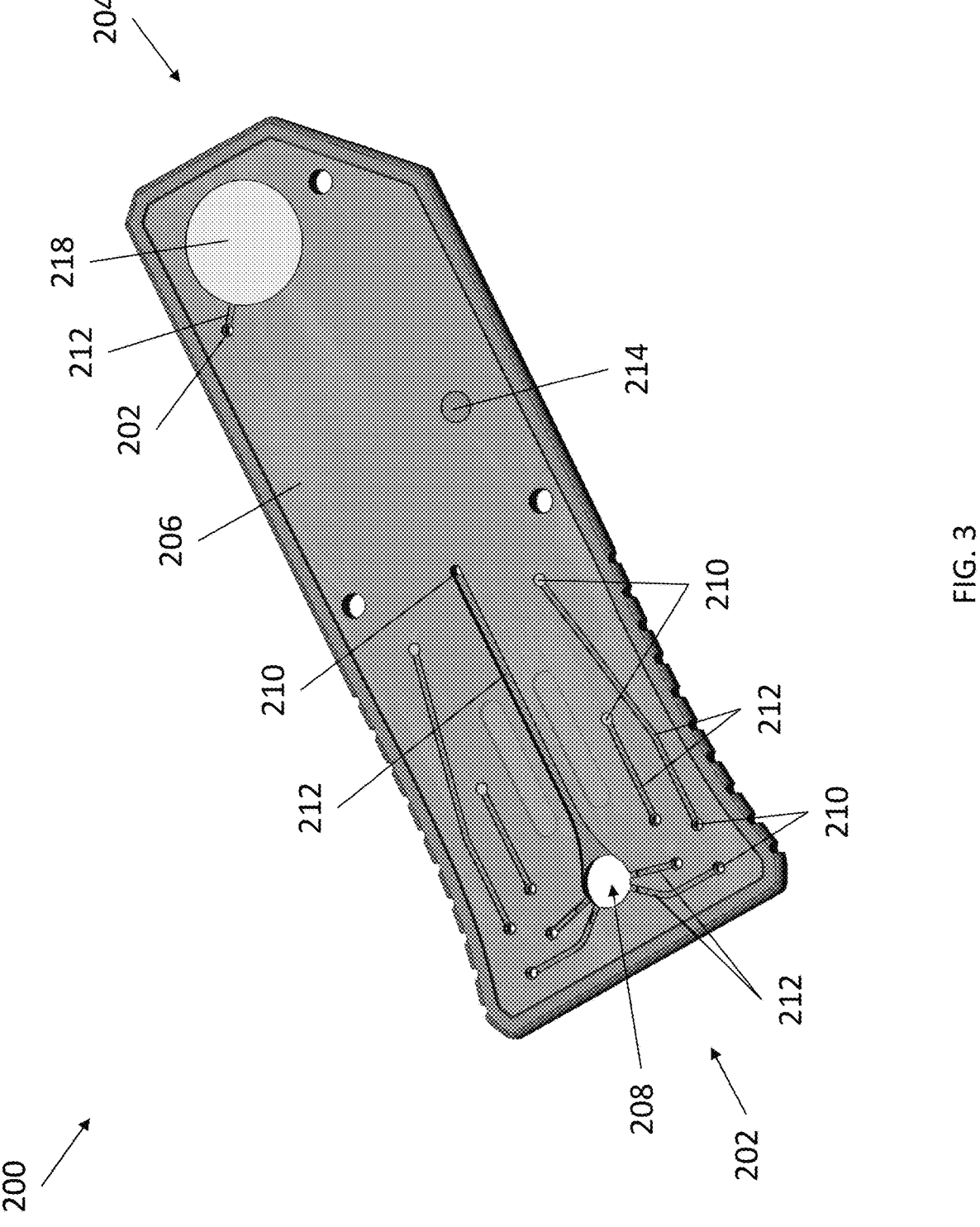
FIG. 3 depicts an underside view of an exemplary cartridge.

Referring now to FIG. 2 and FIG. 3, an exemplary cartridge 200 is depicted. Cartridge 200 comprises a body 206 having a proximal end 202 and a distal end 204. Body 206 has a substantially planar shape having a length, a width, and a thickness housing several components. The length, width, and thickness can have any desired dimension, such as a length between about 50 mm and 150 mm, a width between about 50 mm and 150 mm, and a thickness between about 1 mm and 10 mm. In some embodiments, body 206 is dimensioned to be substantially similar to commonly used microscope slides, such as a length, width, and thickness of about 75 mm, 26 mm, and 1.6 mm. In some embodiments, body 206 can comprise one or more external features, such as a grip 224.

At proximal end 202, cartridge 200 comprises central chamber 208 fluidly connected to a proximal end of microchannel 212, wherein microchannel 212 intersects at least one sensor region 214. Microchannel 212 is in turn fluidly connected at a distal end to at least one waste reservoir 216, and the at least one waste reservoir 216 is in turn fluidly connected to at least one actuation chamber 218. Actuation chamber 218 is covered with a thin, flexible membrane such that compressing the thin flexible membrane and releasing the thin flexible membrane to permit it to return to its resting state moves fluids (gases and liquids) through microchannel 212. In some embodiments, the thin flexible membrane can be flush with a top surface of body 206. In other embodiments, the thin flexible membrane can be domed in a convex or concave manner.

Figure 4:
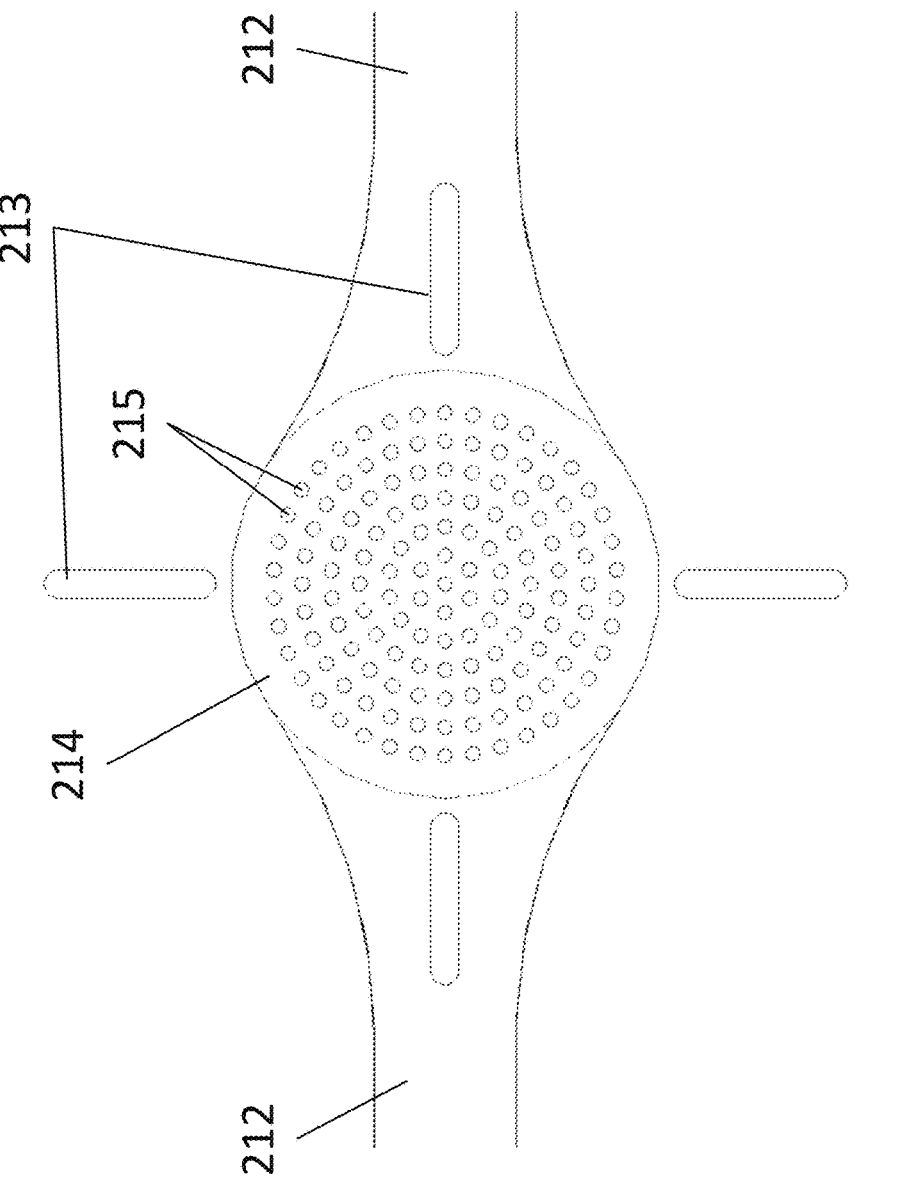
FIG. 4 depicts a magnified view of an exemplary cartridge sensor.

Sensor region 214 can comprise desired sensing mechanism commonly used in art, including but not limited to chemically active regions, electrochemical sensors, immobilized capture molecules, probes, and the like. Contemplated probes or capture agents can be any suitable molecule, including antibodies, antibody fragments, antigens, proteins, nucleic acids, oligonucleotides, peptides, lipids, lectins, inhibitors, activators, ligands, hormones, cytokines, sugars, amino acids, fatty acids, phenols, alkaloids, and the like. The probes or capture agents can be configured to capture any desired molecule, including proteins, amines, peptides, antigens, antibodies, nucleic acids, steroids, eicosanoids, DNA sequences, RNA sequences, bacteria, viruses, and fragments thereof. In some embodiments, the probes or capture agents are configured to capture compounds indicative of drug use or presence, including but not limited to marijuana (THC), synthetic cannabinoids (K2/spice), cocaine/benzoylecgonine, codeine/morphine, hydrocodone/hydromorphone, oxycodone/oxymorphone, heroin/6-acetylmorphine, fentanyl, buprenorphine, phencyclidine (PCP), methampehetamine/amphetamine, and MDMA/MDA. Referring now to FIG. 4, a magnified view of an exemplary sensor region 214 is depicted. Sensor region 214 comprises a plurality of sensor spots 215 having a 100 μm diameter and arranged in an array having a 200 μm pitch, wherein each sensor spot 215 can comprise different sensing capabilities or be specific to a different analyte of interest. The depicted sensor region 214 occupies a circular area having a diameter of about 3 mm and represents a spot volume of about 50 picoliters. However, it should be understood that sensor region 214 can have any desired number, size, and arrangement of sensor spots 215, such that sensor region 214 can have any suitable shape and size.

In some embodiments, cartridge 200 further comprises one or more additional reagents stored onboard. The one or more additional reagents can include tags that can be conjugated to captured particles of interest from a fluid sample. The tag can be any material having a detectable physical or chemical property. Thus, a tag is any composition detectable by spectroscopic, photochemical, biochemical, immunochemical, electrical, optical, or chemical means. Means of detecting tags are well known to those of skill in the art. Thus, for example, where the tag is a radioactive label, means for detection include a scintillation counter or photographic film as in autoradiography. Where the tag is a fluorescent label, it may be detected by exciting the fluorochrome with the appropriate wavelength of light and detecting the resulting fluorescence, e.g., by microscopy, visual inspection, via photographic film, by the use of electronic detectors such as charge coupled devices (CCDs) or photomultipliers and the like. Similarly, enzymatic tags may be detected by providing appropriate substrates for the enzyme and detecting the resulting reaction product. Finally, simple colorimetric tags may be detected simply by observing the color associated with the tag.

In some embodiments, the one or more reagents are stored within at least one fluid chamber 222 fluidly connected to central chamber 208 by a microchannel 212. In some embodiments, the one or more additional reagents are stored in at least one reagent chamber 220 in a liquid or solid-state form. Each reagent chamber 220 is fluidly connected at a first end to central chamber 208 by a microchannel 212 and at a second end to a fluid chamber 222 by a microchannel 212, such that fluid within a fluid chamber 222 may reconstitute or bring a reagent to a final dilution when passing through a reagent chamber 220. In various embodiments, fluid chamber 222 can include a hermetically sealed, fluid-filled chamber, blister, or syringe that dispenses contents contained therein upon applying external pressure and breaking the seal.

Openings 210 are provided throughout cartridge 200 to illustrate the locations where microchannels 212 are fluidly connected to the chambers and reservoirs described herein. In some embodiments, openings 210 comprise a valve or seal, such that flow between microchannels 212, chambers, and reservoirs can be metered and controlled with precision. In some embodiments, openings 210 comprise passive valves. For example, a passive valve can be described as variation in opening 210 or microchannel 212 cross-sectional area, wherein an opening 210 or microchannel 212 having a larger cross-sectional area presents a lower capillary pressure than an opening 210 or microchannel 212 having a smaller cross-sectional area. A fluid flowing through a network of microchannels 212, when encountering a change in opening 210 or microchannel 212 cross-sectional area, will preferentially flow into the opening 210 or microchannel 212 having the smallest available cross-sectional area as it presents the highest capillary pressure and thus the lowest fluidic resistance. Fluid flow can thereby be influenced by providing microchannels 212 having sections of wider and narrower width, or by presenting openings 210 as locations having wider or narrower width than connecting microchannels 212.

In various embodiments, cartridge 200 can include additional reservoirs, channels, and valves as needed. For example, in some embodiments cartridge 200 can include one or more overflow chambers for retaining excess sample (not pictured). The overflow chambers can be fluidly connected to central chamber 208, waste reservoir 216, or any other fluid carrying structure. In some embodiments, cartridge 200 can include one or more vents or bubble traps for sequestering and/or removing excess air. The vents or bubble traps can be permeable to air and impermeable to liquid. In some embodiments, the vents can expel excess liquid from cartridge 200. In some embodiments, the vents are openings that can be selectively closed or covered to control air or fluid transfer. In some embodiments, cartridge 200 can include one or more chambers or cavities for receiving an external source of a reagent or substance in the form of a liquid, solid, conjugate pad, or dissolvable film.

Figure 5:
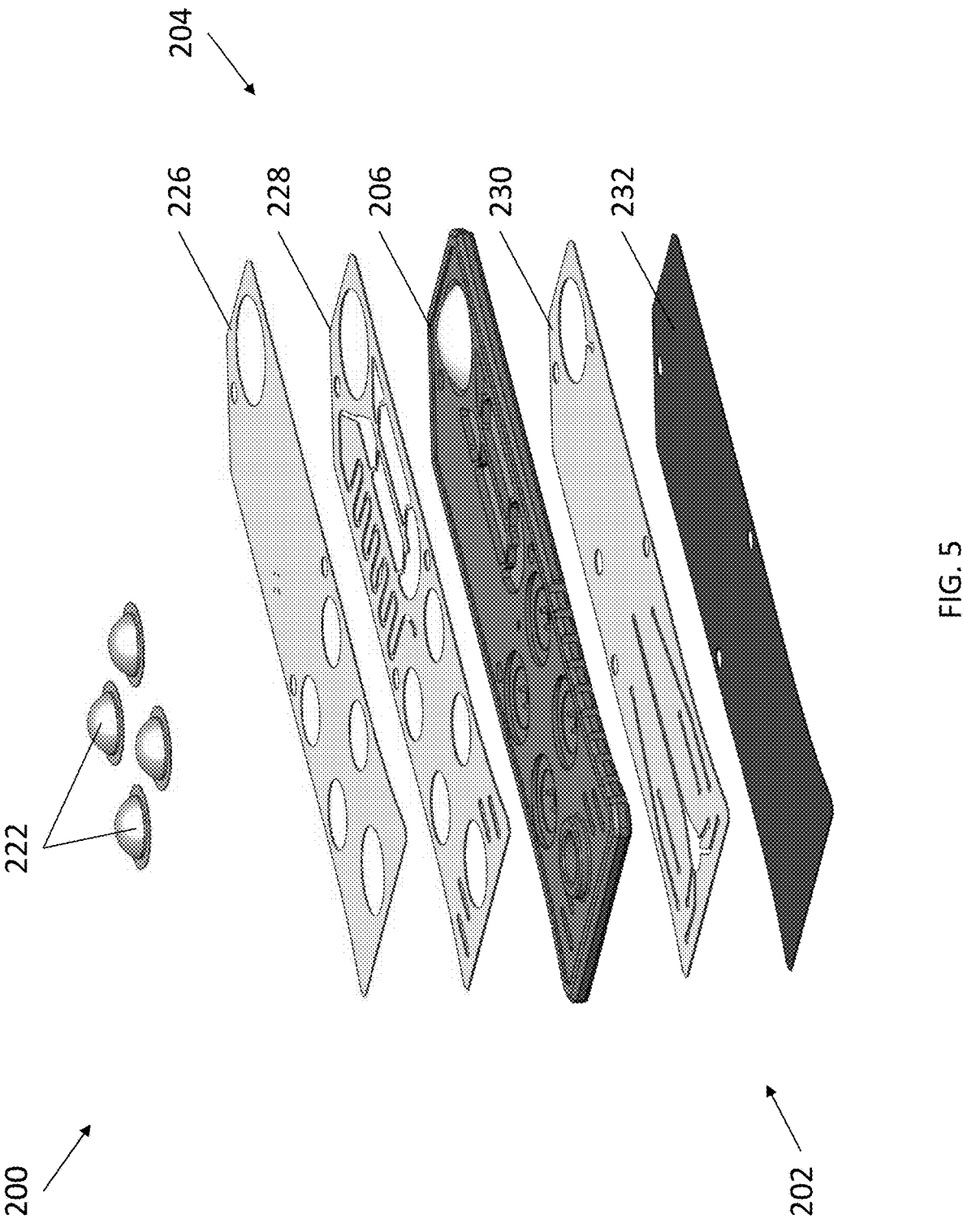
FIG. 5 depicts an exploded view of an exemplary cartridge.

In some embodiments, cartridge 200 can be fabricated as a monolithic device, such as through molding and etching or through 3D printing or other additive manufacturing techniques commonly used in the art. In some embodiments, cartridge 200 can be fabricated in a layered design, such as depicted in FIG. 5, wherein cartridge comprises a cover layer 226 and upper microfluidic layer 228 above body 206 and a lower microfluidic layer 230 and a base layer 232 below body 206. Microchannels 212 can have paths charted through a layer, and microchannels 212 can be fluidly connected to chambers, reservoirs, and other microchannels 212 in different layers by openings 210. In some embodiments, fluid chambers 222 can be modular, such that a user may select any number and type of desired fluid chamber 222 for attachment to a cartridge 200. In various embodiments, cartridge 200 is fabricated from transparent, translucent, or at least partially transparent or translucent materials, such that flow within cartridge 200 can be visualized and the one or more sensor regions 214 can be examined by eye or by a reader.

Figure 6A:
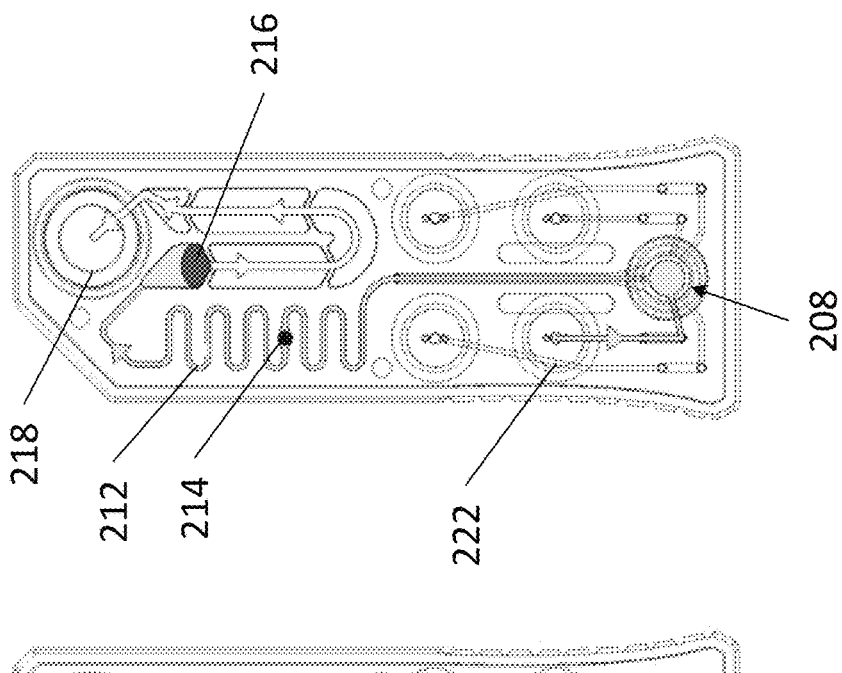
FIG. 6A and FIG. 6B depict a sequence of recirculating fluids using an exemplary cartridge.
Figure 6A:
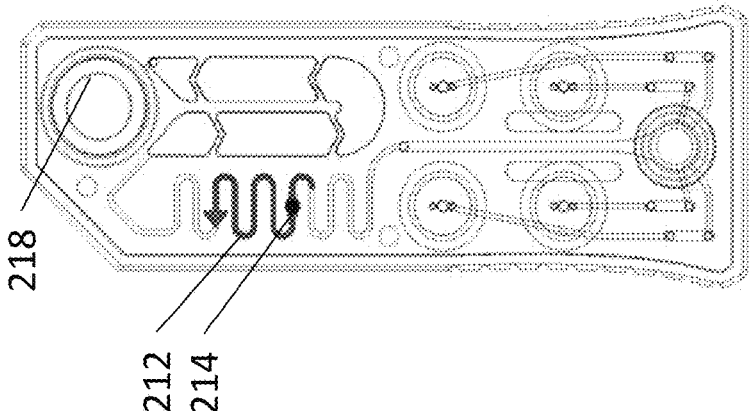
Figure 6A:
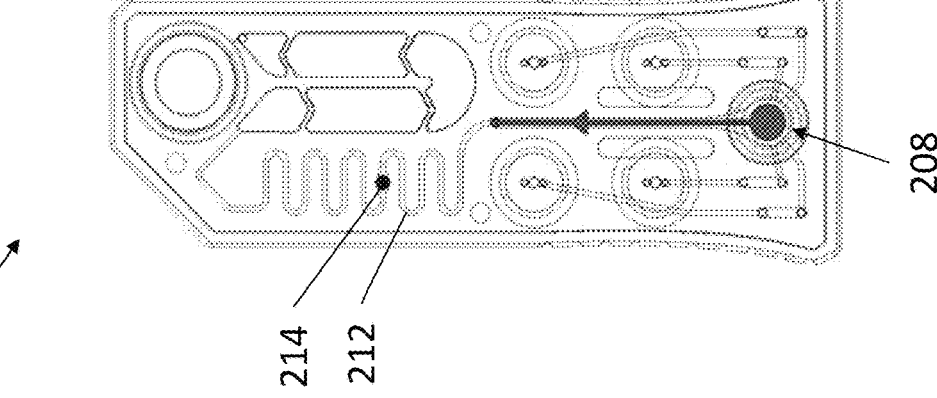
Figure 6B:
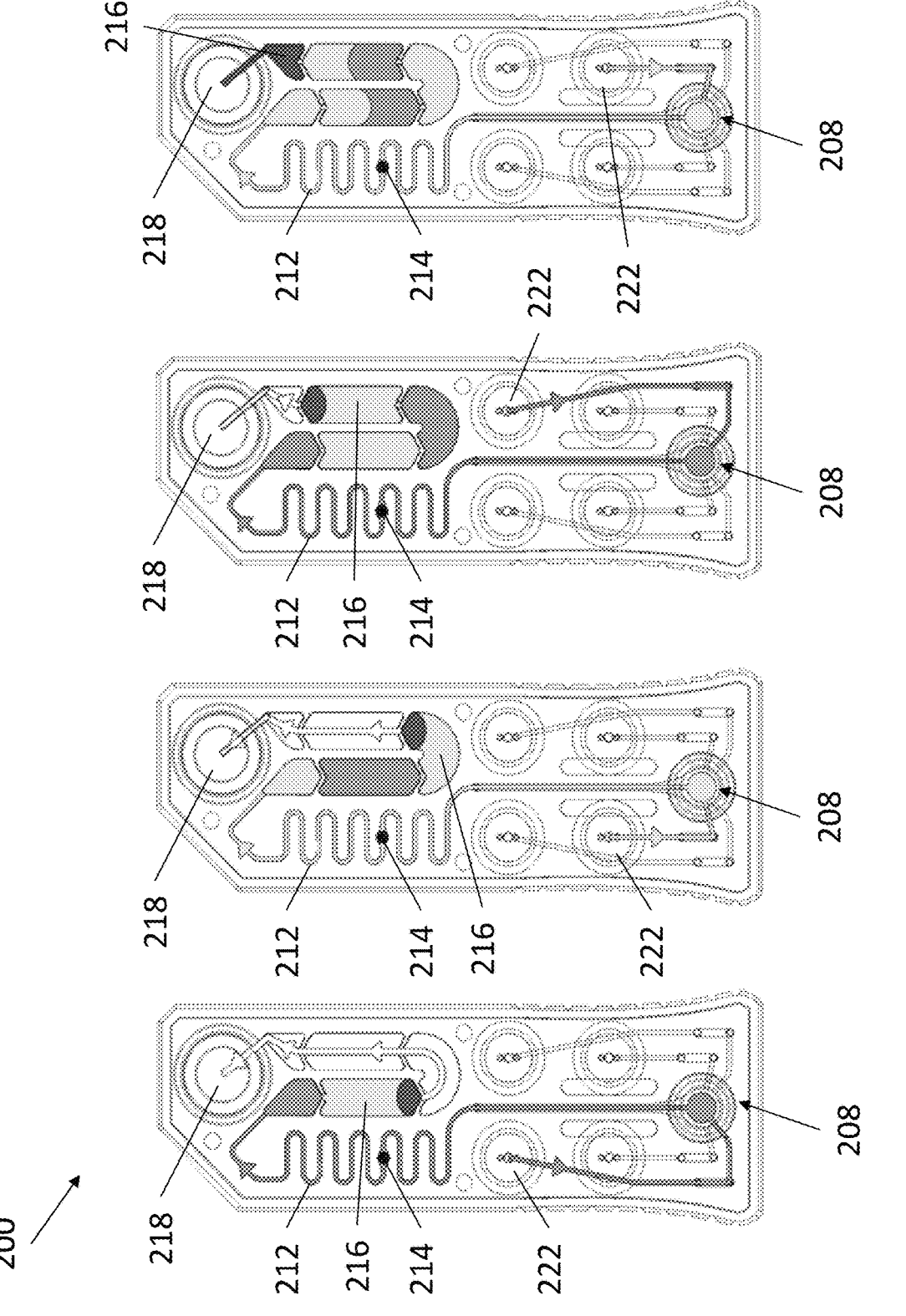

Referring now to FIG. 6A and FIG. 6B, a sequence of illustrations demonstrating an exemplary method of analyte detection from a sample is depicted. In Step 1 (FIG. 6A, left), a sample fluid is input into central chamber 208, whereby the sample fluid is drawn into microchannel 212 towards sensor region 214 by capillary action. Sensor region 214 can include a microarray as described elsewhere herein configured with immobilized antibodies specific to one or more target in solution. In Step 2 (FIG. 6A, center), the sample fluid is recirculated over sensor region 214 by compressing and withdrawing a thin flexible membrane of actuation chamber 218 at the distal end of cartridge 200. In Step 3 (FIG. 6A, right), a wash buffer is input from an internal fluid source contained in a fluid chamber 222, where the fluid is drawn through to waste reservoir 216. In Step 4 (FIG. 6B, left), a reagent is dispensed from a second internal fluid source contained in a fluid chamber 222, where it is drawn through microchannel 212 towards sensor region 214. The reagent can be, for example, an antibody specific to a target in an unconjugated format, or labeled with a probe for detection, or another molecule such as streptavidin. It can be recirculated over sensor region 214 to enhance capture or drawn through to waste reservoir 216 without recirculation. In Step 5 (FIG. 6B, center left), a wash fluid is drawn through cartridge 200 from a fluid chamber 222 to remove excess unbound material. In Step 6 (FIG. 6B, center right), a second reagent is drawn through in a similar manner from a fluid chamber 222. The reagent can be a secondary antibody specific to the species of a primary antibody labeled with a probe, biotin labeled with probe, or another molecule that would facilitate detection or signal amplification in an optical detection scheme. In Step 7 (FIG. 6B, right), a wash fluid is drawn through cartridge 200 from a fluid chamber 222 to remove excess unbound material. In various embodiments, reagents and wash buffers may be stored in separate fluid chambers 222. In some embodiments, wash buffers may be stored in one or more fluid chambers 222 and used in any order.

Cartridge Reader

Figure 7:
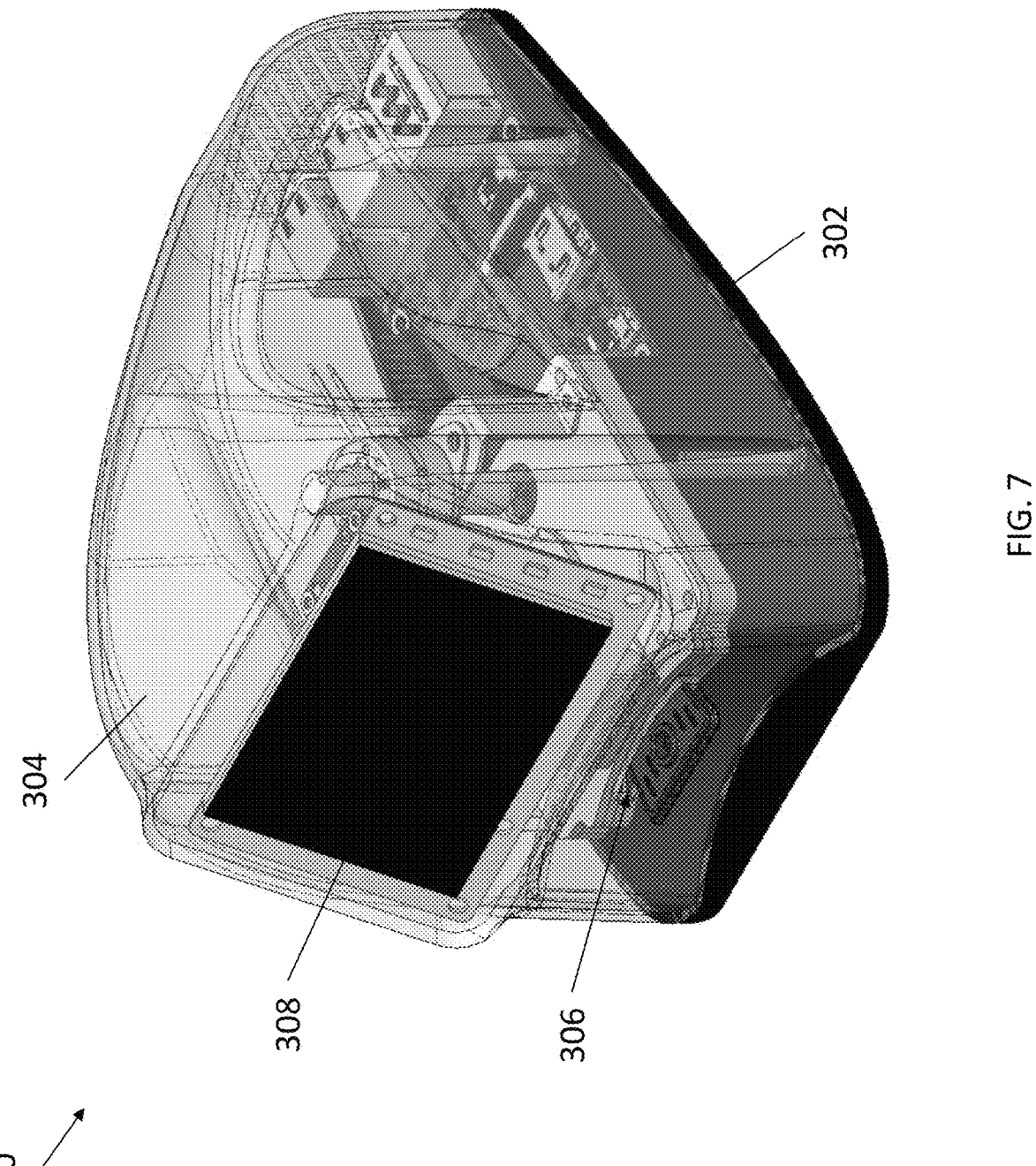
FIG. 7 depicts an exemplary reader, wherein the housing of the reader is depicted as partially translucent such that the interior of the reader is visible.
Figure 8:
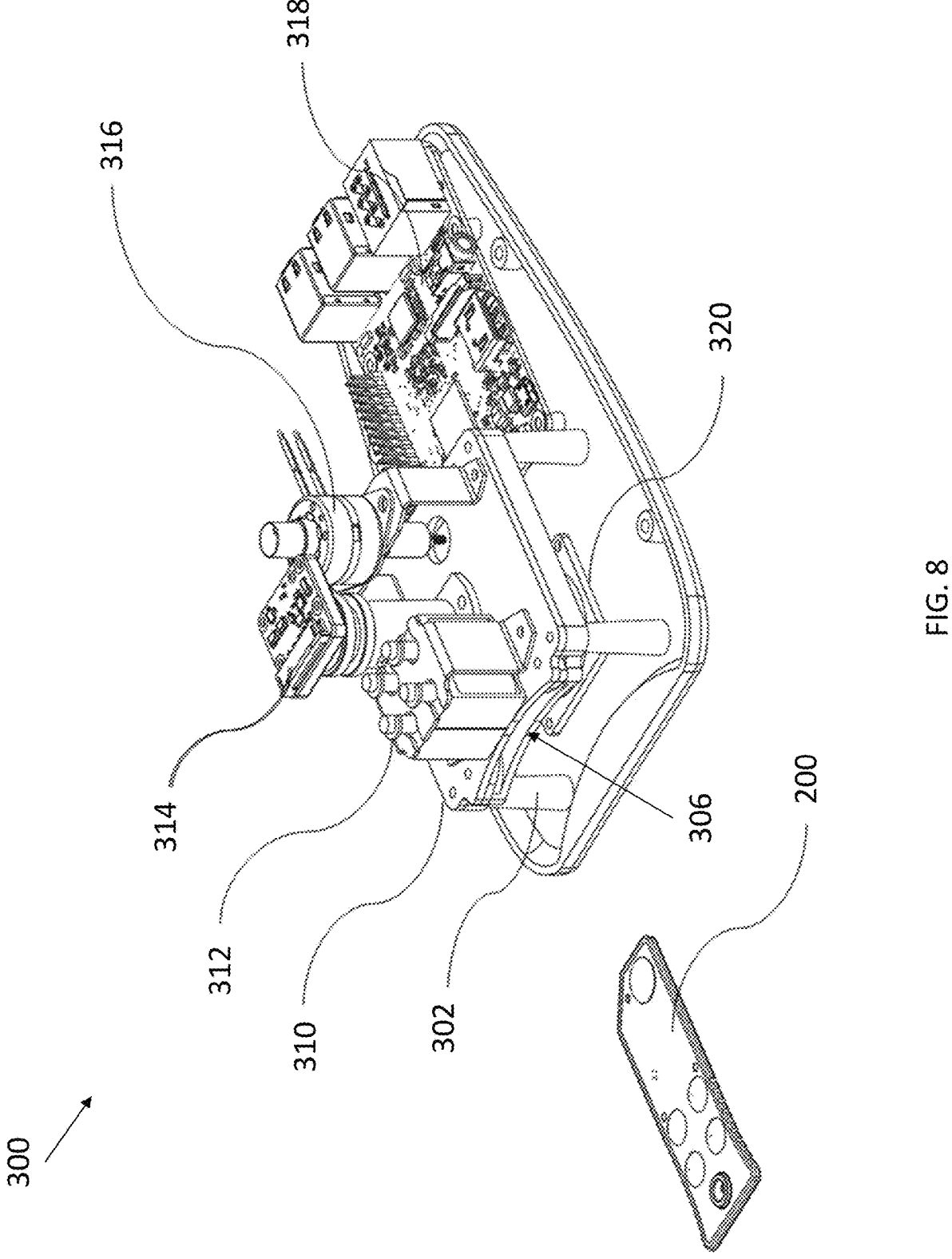
FIG. 8 depicts the interior components of an exemplary reader and an exemplary cartridge.
Figure 9:
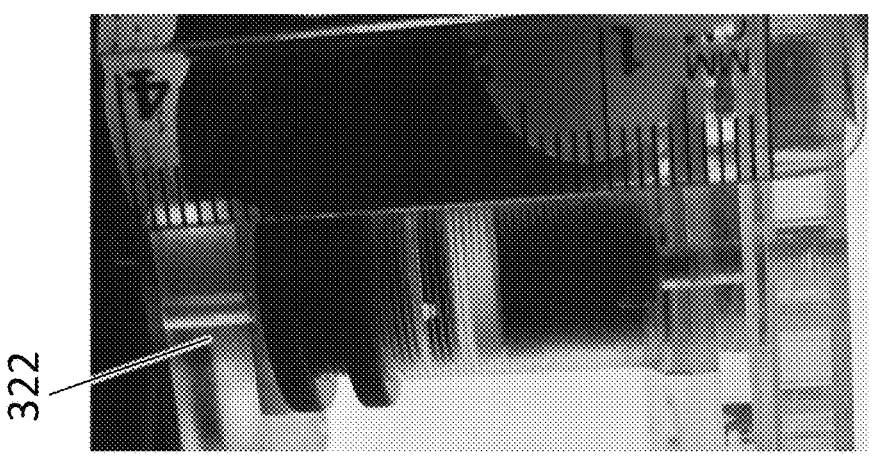
FIG. 9 depicts a top-down view (left), a perspective view (middle) and a side view (right) of an optical sensor holder of an exemplary reader.
Figure 9:
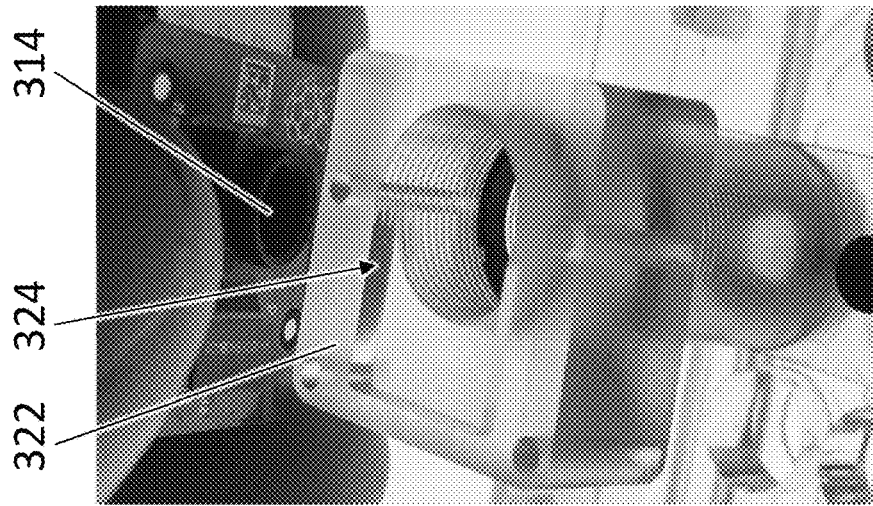
Figure 9:
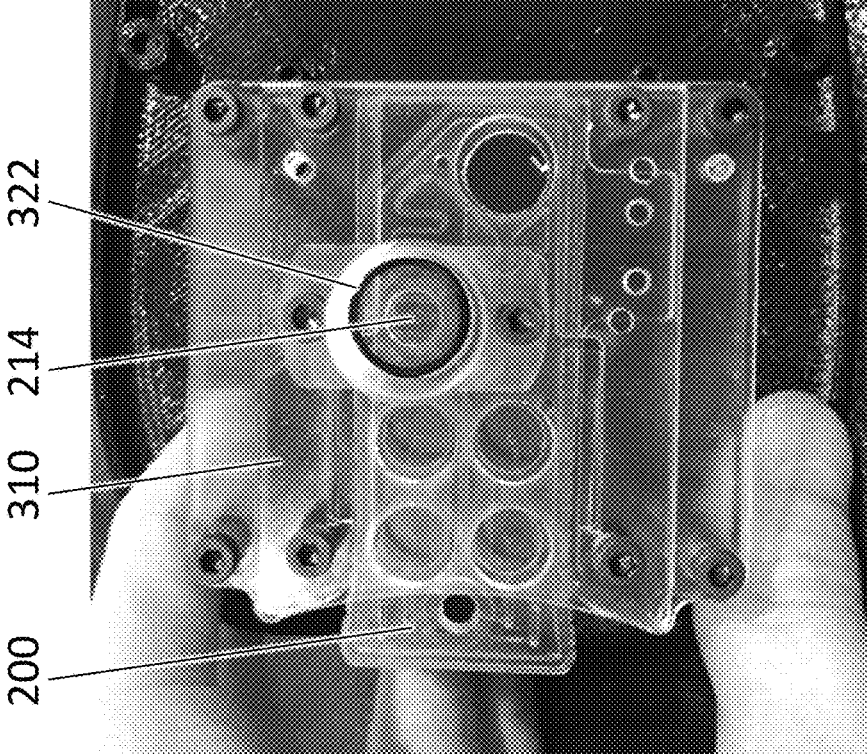

Referring now to FIG. 7 through FIG. 9, an exemplary reader 300 for receiving and processing a cartridge 200 is depicted. Reader 300 is a compact device that can be battery operated and weigh less than 2 lbs, such that it is easily carried by hand for point-of-care use and field use. Reader 300 comprises a base 302 and an external housing 304, wherein housing 304 can have any desired dimensions. For example, housing 304 can have a length, a width, and a height each between about 100 mm and 200 mm. Housing 304 comprises a cartridge port 306 sized to receive a cartridge 200 and a screen 308. Internally, reader 300 comprises a mount 310 holding cartridge port 306. In some embodiments, cartridge port 306 is sized to securely fit a cartridge 200. In some embodiments, cartridge 306 is sized to receive and fit a variety of devices, including but not limited to cartridges 200 in different sizes and glass slides. Cartridge port 306 can comprise internal lateral springs that guide positioning of an inserted device such that chambers and sensor regions are placed in a predetermined alignment with instruments contained in reader 300. Cartridge port 306 can also comprise internal top springs that hold an inserted device securely in place. In some embodiments, Cartridge port 306 can include a latch and release mechanism, such that an inserted device hooks onto an internal latch and is securely in place until the internal latch is removed by a release mechanism.

Mount 310 comprises at least one solenoid 312 positioned above cartridge port 306. Upon insertion of a cartridge 200, one or more fluid chambers 222 are aligned below a solenoid 312, such a solenoid 312 can be selectively activated to depress an aligned fluid chamber 222 and release its contents within the inserted cartridge 200. Likewise, mount 310 comprises at least one stepper motor 316 positioned above cartridge port 306, whereupon insertion of a cartridge 200, one or more actuation chambers 218 are aligned below a stepper motor 316, such that a stepper motor 316 can be selectively activated to depress an aligned actuation chamber 218 to actuate fluids within the inserted cartridge 200. It should be understood that solenoid 312 can be configured to have an activated state that fully depresses an underlying chamber, and stepper motor 316 can be configured to shift between any position between a fully retracted state and a fully extended state that fully depresses an underlying chamber. It should also be understood that any combination of solenoids 312 and stepper motors 316 can be used and arranged in reader 300.

Mount 310 comprises at least one optical sensor 314 positioned above cartridge port 306. Upon insertion of a cartridge 200, one or more sensor regions 214 are aligned below an optical sensor 314. Accordingly, one or more light sources, lenses, and filters can be in alignment with optical sensor 314 and the one or more sensor regions 214. For example, FIG. 8 depicts an LED and condenser lens assembly 320 positioned directly below optical sensor 314. Assembly 320 may also be positioned above mount 310 using a dichroic beam splitter to facilitate epifluorescence imaging. FIG. 9 depicts an optical sensor holder 322 positioned between mount 310 and optical sensor 314. Optical sensor holder 322 can include one or more filter and lens holders in alignment with an optical path between optical sensor 314 and a sensor region 214.

Figure 10:
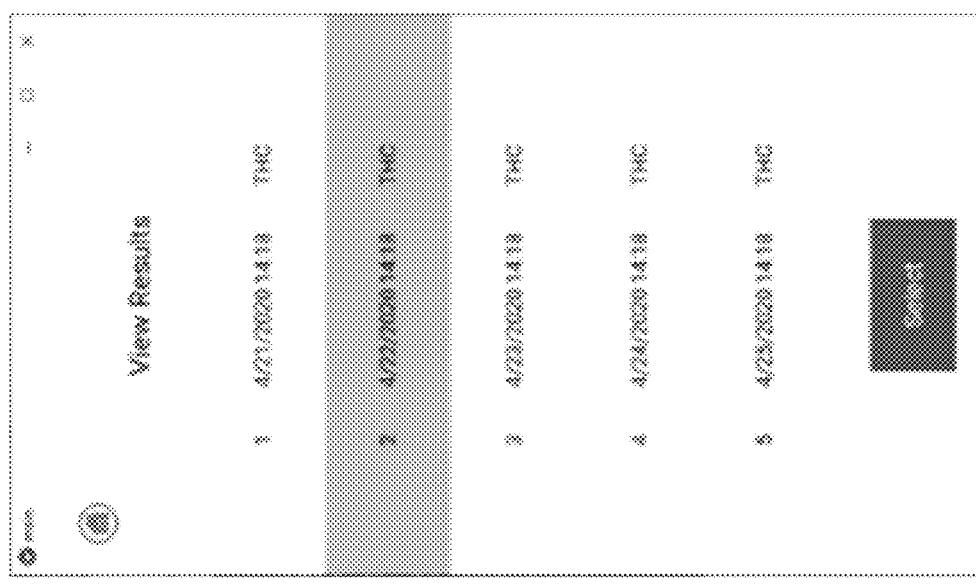
FIG. 10 depicts an exemplary user interface for performing tests and processing results from an exemplary reader.
Figure 10:
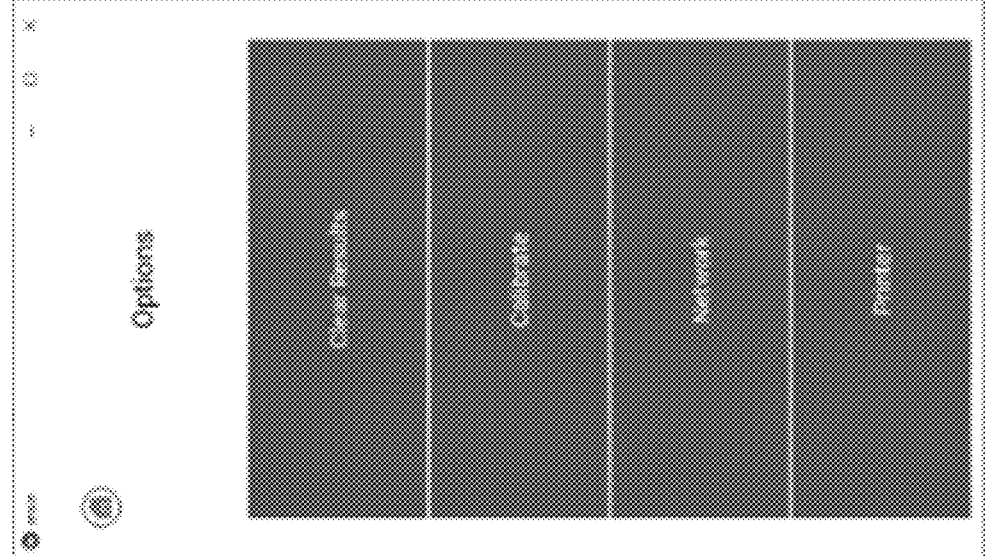
Figure 10:
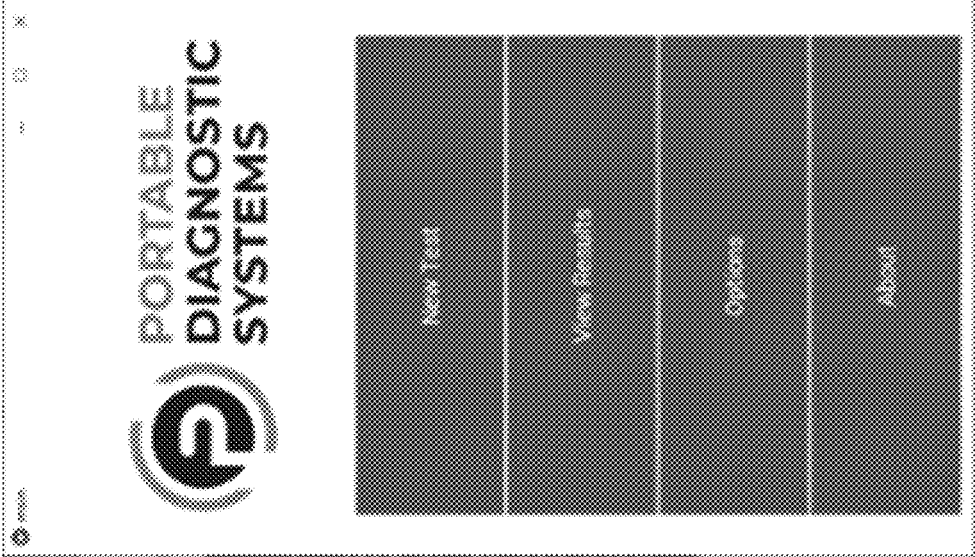
Figure 11:
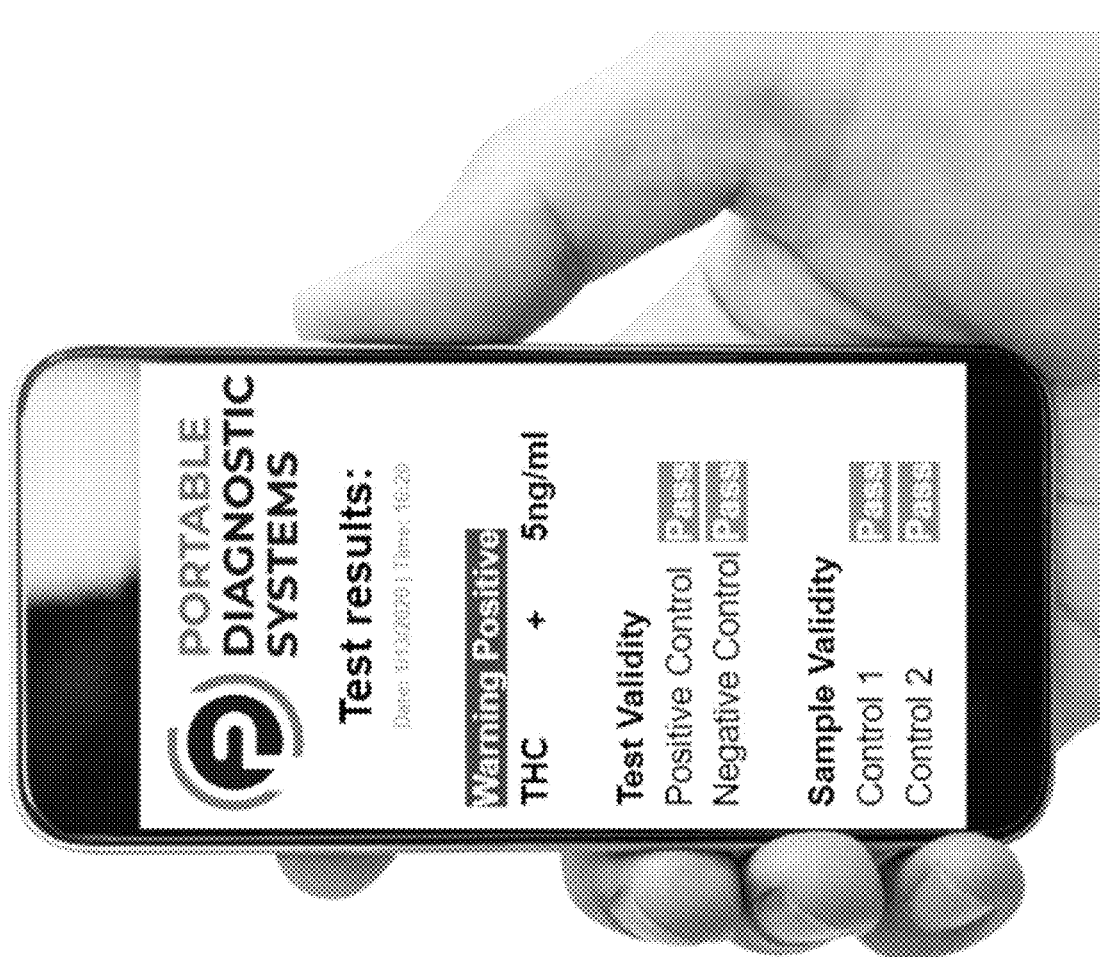
FIG. 11 depicts an exemplary user interface for outputting results from an exemplary reader.

Reader 300 further comprises a computing unit 318. Computing unit 318 can control the activation and actuation of solenoids 312 and stepper motor 316. Computing unit 318 can also control the activation and capture of signals from optical sensor 314. In various embodiments, computing unit 318 can be controlled by screen 308 and output processed data to screen 308. In some embodiments, computing unit 318 can be wirelessly linked to a separate device, such as a desktop, a laptop, a tablet, a cellular phone, a smartphone, or any other device as would be understood by those skilled in the art. Accordingly, computing unit 318 can be controlled from the separate device and output results to the separate device. For example, FIG. 10 depicts an exemplary user interface for a phone application, wherein the phone application can initiate tests, view results, calibrate reader 300, and transmit results. FIG. 11 depicts another exemplary user interface providing control and testing results. As contemplated herein, computing unit 318 may comprise any computing device as would be understood by those skilled in the art, including single-board microcontrollers, desktop or mobile devices, laptops, desktops, tablets, smartphones or other wireless digital/cellular phones, televisions or other thin client devices as would be understood by those skilled in the art.

Computing unit 318 may include at least one processor, standard input and output devices, as well as all hardware and software typically found on computing devices for storing data and running programs (such as non-transitory memory), and for sending and receiving data over a network, if needed. If a central server is used, it may be one server or, more preferably, a combination of scalable servers, providing functionality as a network mainframe server, a web server, a mail server and central database server, all maintained and managed by an administrator or operator of the system. Computing unit 318 may also be connected directly or via a network to remote databases, such as for additional storage backup, and to allow for the communication of files, email, software, and any other data formats between two or more computing devices. There are no limitations to the number, type or connectivity of the databases utilized by computing unit 318. In one embodiment, computing unit 318 further comprises a wireless transceiver to allow connection to remote databases. The communications network can be a wide area network and may be any suitable networked system understood by those having ordinary skill in the art, such as, for example, an open, wide area network (e.g., the internet), an electronic network, an optical network, a wireless network, a physically secure network or virtual private network, and any combinations thereof. The communications network may also include any intermediate nodes, such as gateways, routers, bridges, internet service provider networks, public-switched telephone networks, proxy servers, firewalls, and the like, such that the communications network may be suitable for the transmission of information items and other data throughout the system.

The software may also include standard reporting mechanisms, such as generating a printable results report, or an electronic results report that can be transmitted to any communicatively connected computing device, such as a generated email message or file attachment. Likewise, particular results of the aforementioned system can trigger an alert signal, such as the generation of an alert email, text or phone call, to alert an operator of the particular results. Further embodiments of such mechanisms may be standard systems understood by those skilled in the art.

Figure 12:
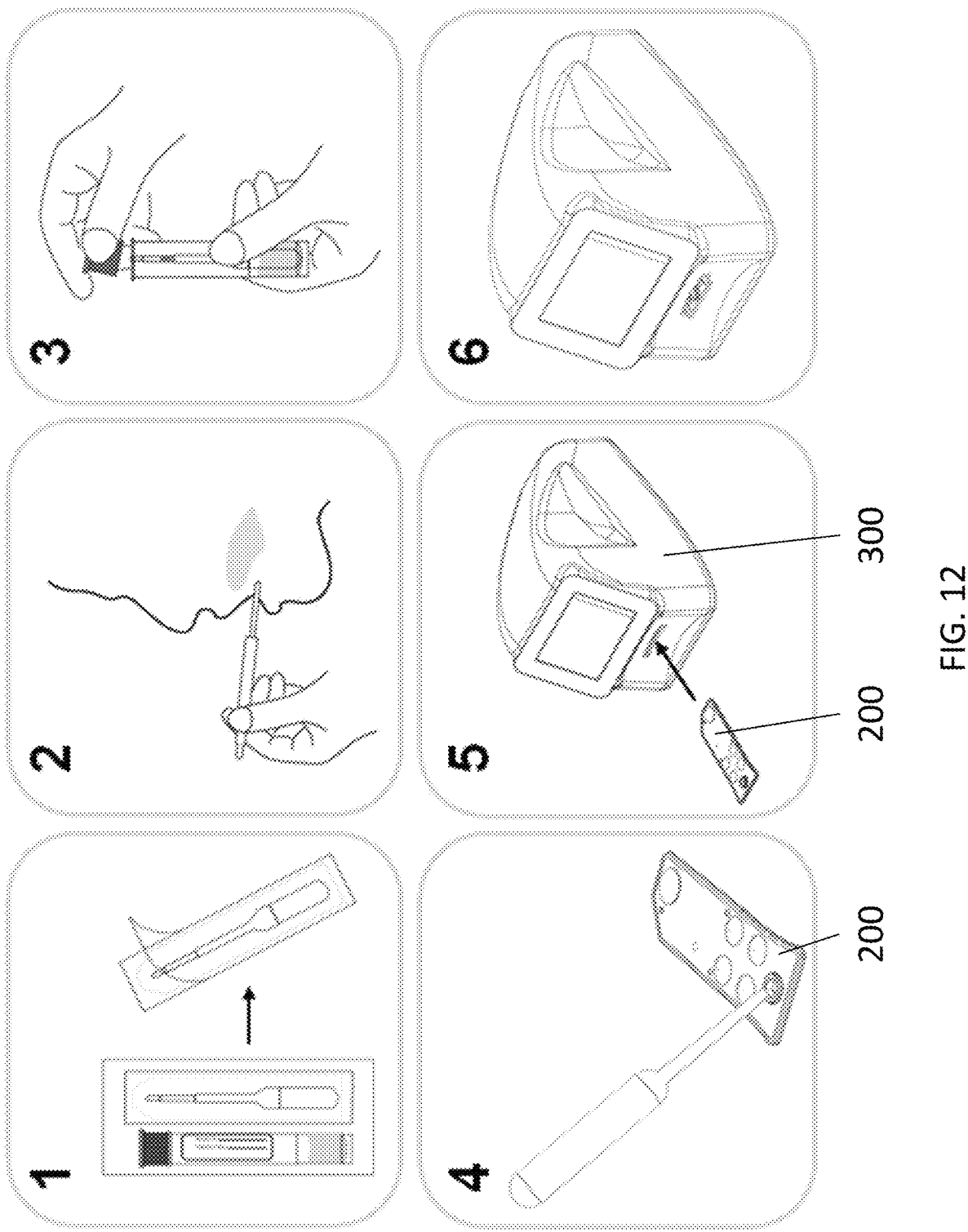
FIG. 12 depicts an exemplary method of acquiring and processing a sample.

Referring now to FIG. 12, a sequence of illustrations demonstrating an exemplary method of analyte detection from a sample using cartridge 200 and reader 300 is depicted. In Step 1, an oral fluid sample kit is opened. In Step 2, an oral fluid sample is collected following kit instructions. In Step 3, a brush is dipped into an extraction buffer following kit instructions. In Step 4, the extraction buffer is dispensed into a central chamber of cartridge 200, as described elsewhere herein. In Step 5, cartridge 200 is inserted into reader 300. In Step 6, reader 300 performs all subsequent steps to process cartridge 200, including depressing the thin flexible membrane of actuator chambers and dispensing the contents of fluid chambers, as well as reading resulting signal responses after completion of assay sequence steps.

Figure 13:
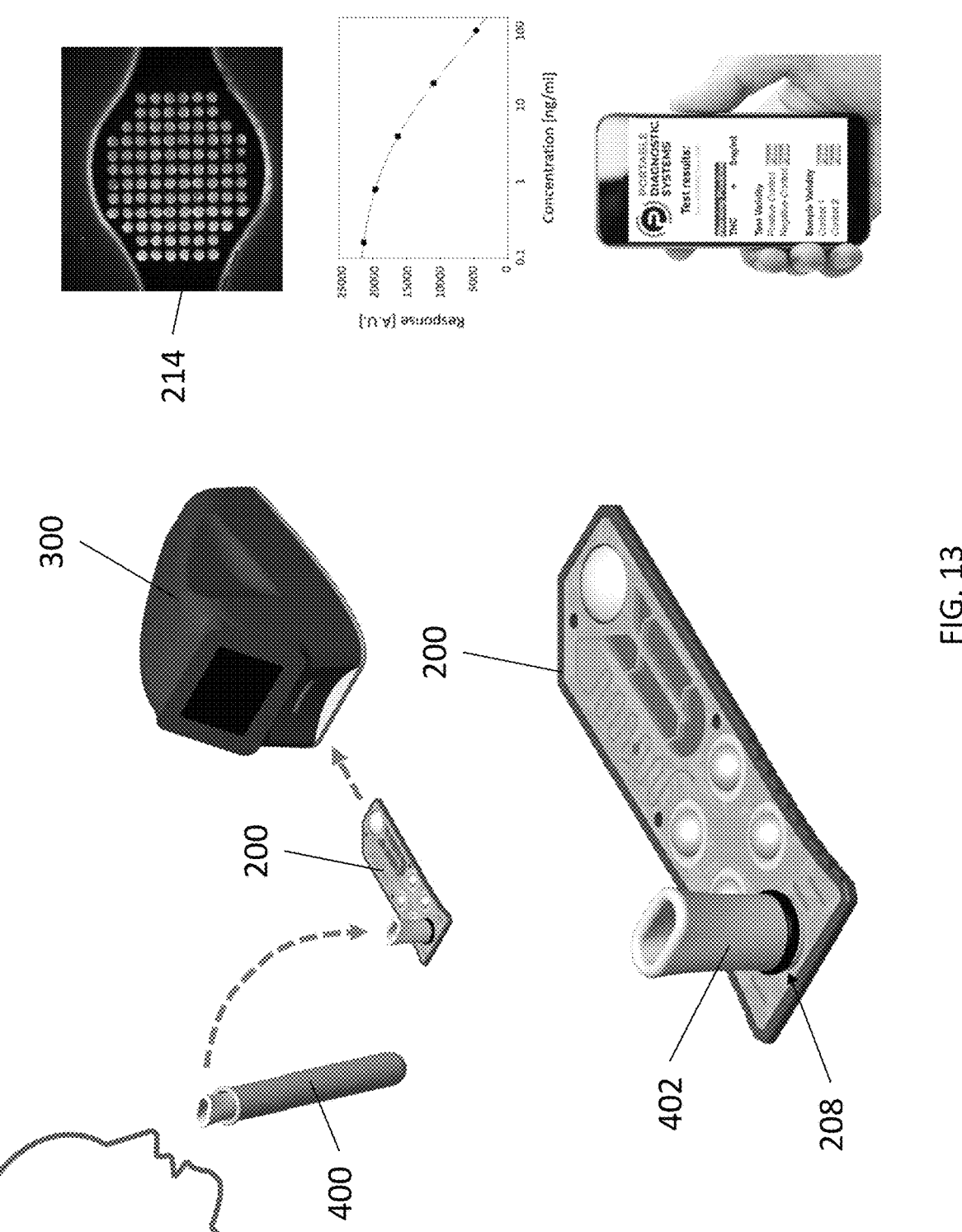
FIG. 13 depicts an exemplary method of acquiring and processing an oral sample.

While any sample kit may be used, the present disclosure also contemplates multi-sample oral fluid collection kits. In certain situations, such as law enforcement's need for legally admissible evidence and preservation of the integrity of chain of custody, samples may need to be retested over a period of time. A multi-sample oral fluid collection kit can split a sample into multiple aliquots simultaneously. For example, FIG. 13 depicts an exemplary collection kit 400 comprising a plurality of aliquots 402, wherein an aliquot of the kit can mount directly to a cartridge 200 such that one aliquot is dispensed to a central chamber 208 of the cartridge 200 for immediate processing and reading by a reader 300, eliminating the need for a transfer bulb dispenser. Thereafter, any captured signal can be detected through colorimetric/fluorescence imaging, quantified, and test results output for view, storage, and transmission. The remaining aliquots can be stored or shipped to a toxicology lab for confirmation analysis (in the event of a positive test result) with a full chain of custody log.

Figure 14:
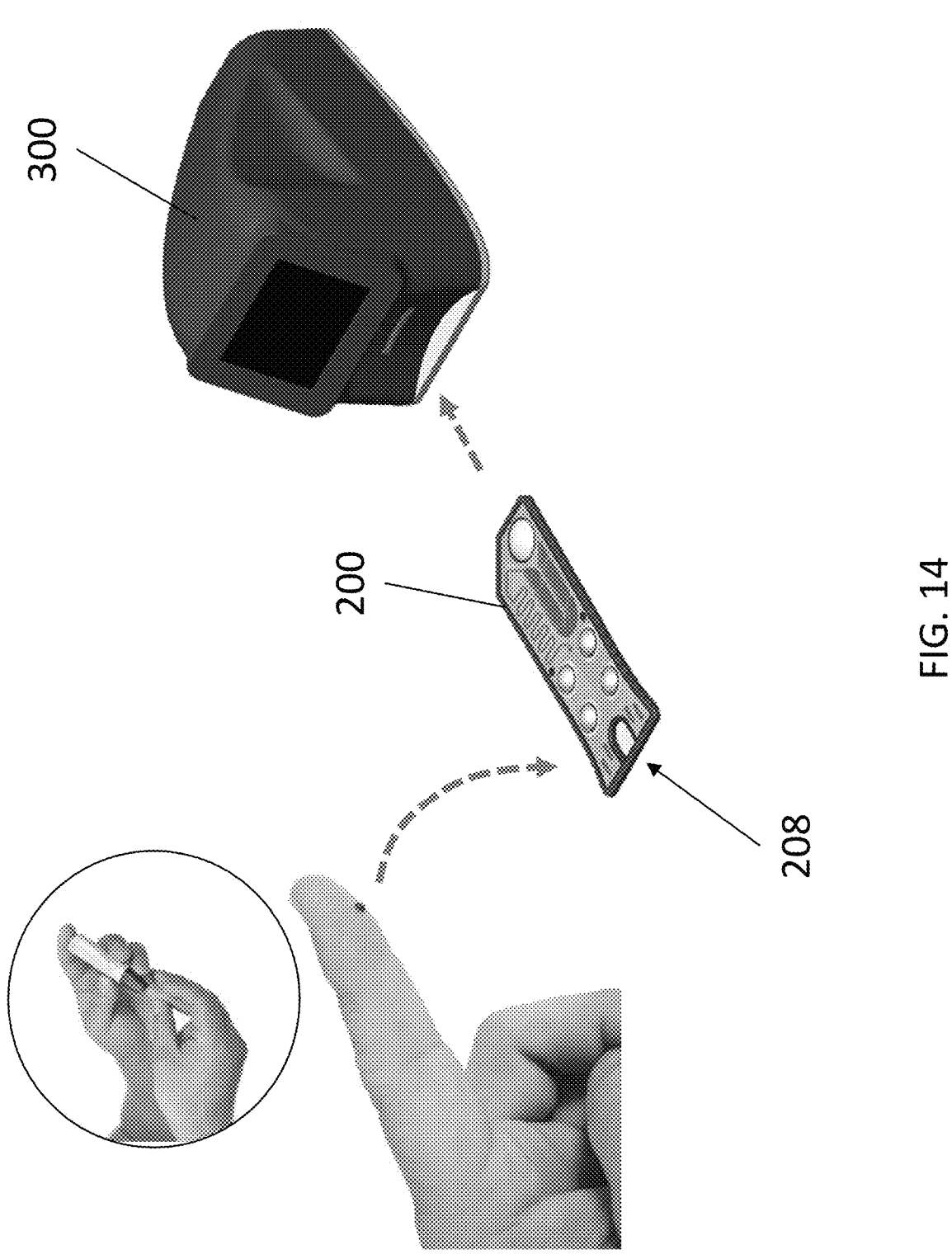
FIG. 14 depicts an exemplary method of acquiring and processing a blood sample.

In another embodiment, the present disclosure also contemplates samples obtained directly from a subject and applied directly to a cartridge 200. For example, FIG. 14 depicts a finger-prick method of drawing blood, wherein a droplet of whole blood is applied directly to a central chamber 208 of a cartridge 200 from a subject's finger for processing and reading by a reader 300. It should be understood that direct from-subject samples are not limited to whole blood, but also can include saliva samples, tear samples, sweat samples, mucus samples, urine samples, and the like.

Figure 15:
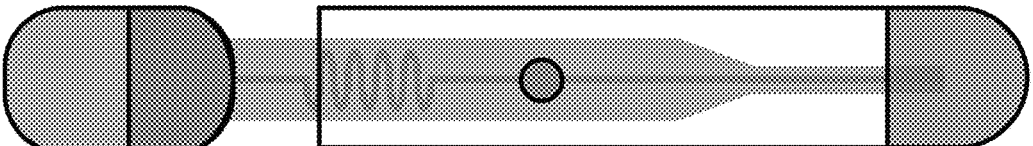
FIG. 15 depicts an exemplary squeeze bulb cartridge device.
Figure 15:
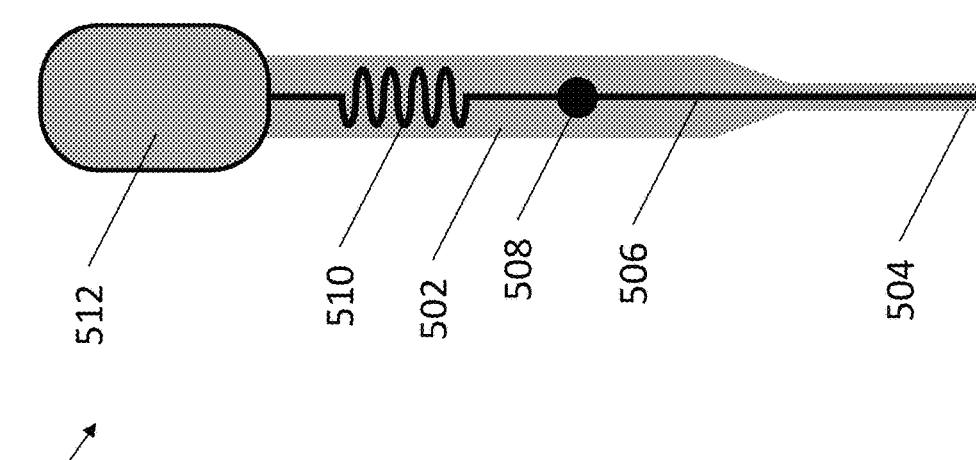
Figure 15:
Figure 16:
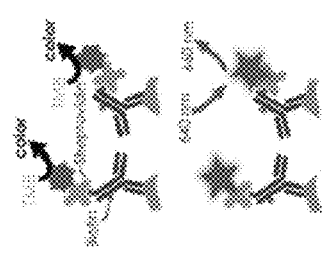
FIG. 16 depicts the results of fabricating sensor probes for use in an exemplary cartridge.
Figure 16:
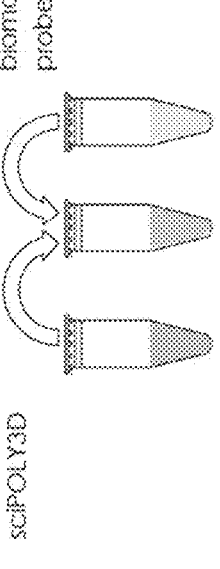
Figure 16:
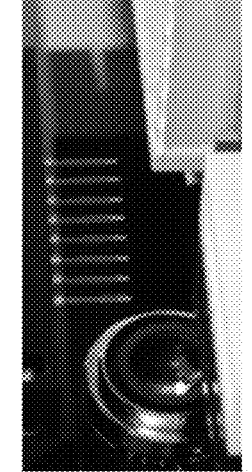
Figure 16:
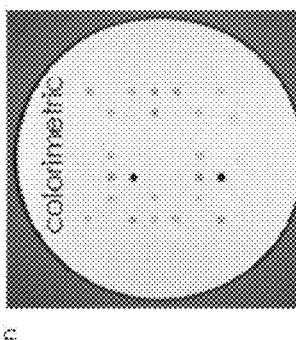
Figure 16:
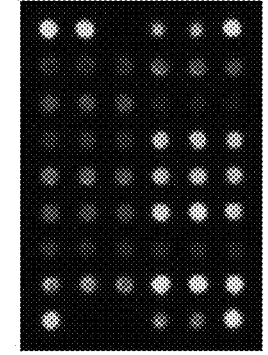
Figure 16:
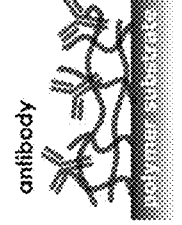

In another embodiment, the present disclosure also contemplates pipette-like cartridges. Referring now to FIG. 15, an exemplary squeeze bulb device 500 is depicted. Device 500 comprises a body 502 through which runs a microchannel 506 fluidly connecting a distal port 504 to a squeezable proximal bulb 512. Microchannel 506 further comprises at least one sensor region 508 and a flow constrictor region 510. Each sensor region 508 is similar to sensor regions 214 described elsewhere herein. Device 500 can be used similar to a pipette by squeezing bulb 512 to expel air from device 500, then introducing distal port 504 into a sample fluid. Releasing bulb 512 creates a vacuum within microchannel 506 as bulb 512 expands to return to its original shape, thereby aspirating a sample fluid into distal port 504. Given the fluid path provided by microchannel 506, the sample fluid passes through the at least one sensor region 508. Flow constrictor region 510 is formed by a length of microchannel 506 having a winding path, wherein flow constrictor region 510 is configured to slow the flow of the sample fluid, giving it more time to react with the at least one sensor region 508. In some embodiments, a binding assay between the sample fluid and the at least one sensor region 508 is complete when bulb 512 regains its original shape. In some embodiments, bulb 512 can be squeezed a plurality of times while distal port 504 is within the sample fluid to recirculate the sample fluid, thereby providing additional passes between the sample fluid and the at least one sensor region 508.

EXPERIMENTAL EXAMPLES

The disclosure is further described in detail by reference to the following experimental examples. These examples are for purposes of illustration, and are not intended to be limiting. Thus, the disclosure should in no way be construed as being limited to the following examples, but rather, should be construed to encompass any and all variations related to the teaching provided herein.

It is believed that one of ordinary skill in the art may, using the preceding description and the following illustrative examples, utilize the present disclosure and practice the claimed methods. The following working examples therefore, specifically point out exemplary embodiments, and are not to be construed as limiting in any way.

Example 1: Cartridge Sensor Region Fabrication

Sensor regions comprising biomolecule probes were fabricated using Scienion sciPOLY3D. sciPOLY3D was chosen as it does not rely on surface activation, can be added to printing media, is UV cured within 2 minutes, and can be crosslinked to common plastic substances (COP, PMMA, COC, PP, etc.). As shown in FIG. 13, sciPOLY3D and biomolecule probes were mixed and printed onto an unmodified polymer support and cured using UV light to form sensor spot arrays. Incubating the sensor spot arrays showed successful binding detectable under colorimetric and fluorescence imaging.

Referring now to FIG. 14A through FIG. 14B, preliminary data obtained from a cartridge implementing a sensor spot array is shown. FIG. 14A shows the signal response for a 6×6 sensor spot array configured with mouse IgG antibody detected with a labeled anti-mouse secondary antibody for a 1-minute assay. FIG. 14B is a bar graph showing the significant benefit of recirculation of sample to improve signal intensity. FIG. 14C is a bar graph showing excellent within run precision (n=3) for 0.1 and 0.01 mg/ml mouse IgG antibody. FIG. 14D is a standard curve for mouse IgG antibody assay showing excellent fit to a 4-parameter logistic regression with 4 log range.

In addition, custom-engineered single-domain antibodies, or nanobodies, were investigated for illicit drug capture from a sample screened against interfering substances during production, which improves specificity to target and reduces false positive test results. Nanobodies offer numerous inherent advantages over traditional IgG antibodies, including faster production time at lower cost, smaller size (12-15 kDa compared to 150 kDa), monovalency (binds to only one target at a time), lower hydrophobicity (less prone to stick to plastic), enhanced stability, and higher affinity, avidity, and specificity to target. High-density microarray sensors described herein can be configured with immobilized antibodies specific to the nanobody-drug complex that will not capture the nanobody or drug alone. Using the novel immunoassay approach presented here, the signal response builds from low-to-high intensity allowing lower drug concentrations to be resolved, which results in better analytical sensitivity.

Example 2: Fentanyl Case Study

Figures 18A, 18B, 18C:
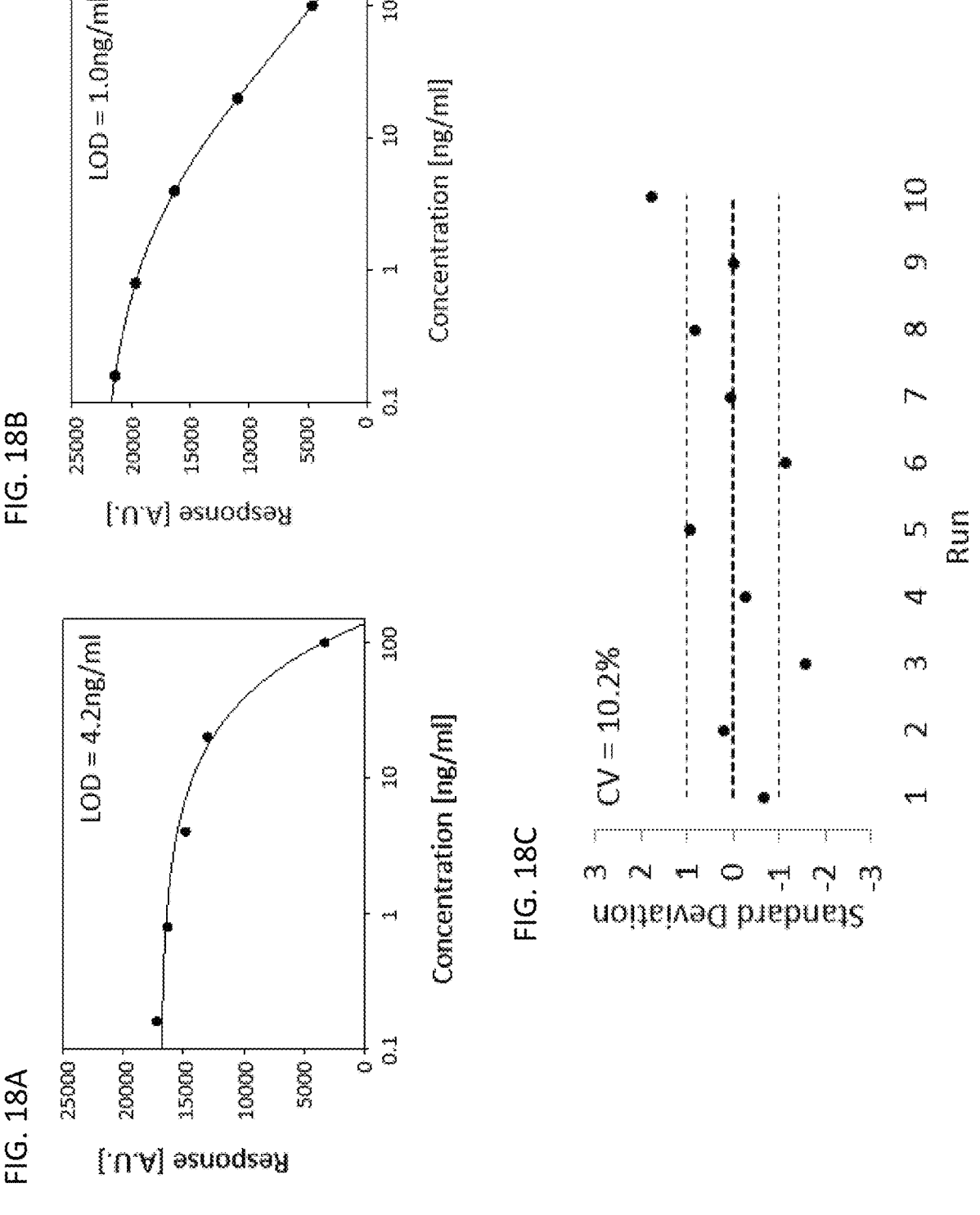
FIG. 18A through FIG. 18C depict the results of preliminary data directed to fentanyl detection. Standard curves for fentanyl generated with single pass unidirectional flow (FIG. 18A) are less sensitive than those that utilize a recirculating flow strategy (FIG. 18B) in the same time frame.

A competitive binding assay was developed for fentanyl, which is an important synthetic opioid 50 to 100 times more potent than morphine. Fentanyl is a 'tier 1' priority drug recommended by the National Safety Council for detection in the toxicological investigation of drug-impaired driving and motor vehicle fatalities. In the competitive immunoassay format, when no drug is present in the sample, anti-drug antibodies used as reagents are free to bind to corresponding drug molecules immobilized on the substrate. These are used in the cartridge as sensing elements. However, if the target drug molecules are present in the sample, the anti-drug antibody reagents are inhibited from binding to the sensing elements. This results in a concentration response curve with a negative slope, as shown in FIG. 18A and FIG. 18B. On the Integrity-1 Analysis System (early in-development prototype), standard curves generated with recirculating flow (FIG. 18B) resulted in a 4.2-fold decrease in LOD compared to those generated with single pass flow (FIG. 18A) conducted in 4 min total assay time using only 20 μL sample volume. Using the novel recirculation technique described elsewhere herein, the signal intensity was increased across the concentration range, meeting the 1 ng/ml cut-off concentration for fentanyl detection recommended by the National Safety Council. Further, excellent run-to-run repeatability was also achieved in a single-site precision study on 10 different independently assayed test cartridges with a 10.2% inter-assay coefficient of variance (FIG. 18C). This data was collected with initial conditions that do not benefit from significant optimization. With this data, the basic function of the Integrity-1 Analysis System was established using both unidirectional flow and recirculating flow. The ability to functionalize cartridges with 100 independently addressable sensing spots was also demonstrated, generating calibration curves on the system spanning a 3-log range, and achieving relevant limits of detection for an important drug of abuse with priority importance in DUID enforcement: fentanyl.

The disclosures of each and every patent, patent application, and publication cited herein are hereby incorporated herein by reference in their entirety.

While this disclosure is provided with reference to specific embodiments, other embodiments and variations are intended to be included in the scope of the present disclosure. The appended claims are intended to be construed to include all such embodiments and equivalent variations.

What is claimed is:

1. A microfluidic device, comprising:
   a housing, comprising a sample chamber and a reservoir;
   a microchannel positioned in the housing, comprising a lumen enclosed within the housing and extending from the sample chamber at a first end to the reservoir at a second end opposite the first end;
   the microchannel comprising a sensor region positioned within the lumen of the microchannel, comprising an array of sensing elements positioned on an inner surface of the lumen; and
   an actuating chamber in fluid communication with the reservoir and with the microchannel, wherein the actuating chamber is enabled to recirculate a fluid in the reservoir from the sensor region through the microchannel back to the sensor region.

2. The microfluidic device of claim 1, wherein the actuating chamber comprises a flexible membrane for generating a pressure differential in the microchannel to motivate fluid flow.

3. The microfluidic device of claim 2, wherein the microchannel is configured to transport a liquid sample by capillary action.

4. The microfluidic device of claim 3, wherein the actuating chamber is configured to recirculate the liquid sample over the sensor region in response to depressing and releasing the flexible membrane.

5. The microfluidic device of claim 1, further comprising:
a passive valve in fluid communication with the sample chamber at the first end of the microchannel.

6. The microfluidic device of claim 1, wherein the sensor region has a diameter that is greater than a diameter of a remainder of the lumen.

7. The microfluidic device of claim 1, further comprising:
a fluid chamber configured for fluid communication with the sample chamber.

8. The microfluidic device of claim 7, further comprising:
a seal between the fluid chamber and the sample chamber, wherein the seal is breakable to provide the fluid communication between the fluid chamber and the sample chamber.

9. The microfluidic device of claim 7, wherein the fluid chamber comprises a liquid selected from a wash buffer, an aqueous liquid, or a reagent.

10. The microfluidic device of claim 7, further comprising:
a reagent chamber configured for fluid communication with the fluid chamber and the sample chamber, wherein the reagent chamber stores a reagent.

11. The microfluidic device of claim 10, wherein the reagent is a liquid or a solid.

12. The microfluidic device of claim 1, wherein the microfluidic device is located on a cartridge body having a planar shape with a length between 50 mm and 150 mm, a width between 50 mm and 150 mm, and a thickness between 1 mm and 10 mm.

13. The microfluidic device of claim 1, wherein the array of sensing elements includes at least one of: an antibody, an antibody fragment, an antigen, a protein, a nucleic acid, an oligonucleotide, a peptide, a lipid, a lectin, an inhibitor, an activator, a ligand, a hormone, a cytokine, a sugar, an amino acid, a fatty acid, a phenol, or an alkaloid.

14. The microfluidic device of claim 1, wherein the array is circular in shape and comprises a regular pattern of the sensing elements.

15. A method of operating a microfluidic device, the method comprising:
dispensing a sample fluid into a microchannel comprising a lumen;
conveying the sample fluid a first time over a sensor region positioned within the lumen of the microchannel;
conveying the sample fluid from the microchannel into a reservoir;
using an actuating chamber, forcing the sample fluid from the reservoir back into the microchannel, wherein the actuating chamber comprises a flexible membrane for forcing the sample fluid; and conveying the sample fluid a second time over the sensor region;
wherein the sensor region includes at least one of: an antibody, an antibody fragment, an antigen, a protein, a nucleic acid, an oligonucleotide, a peptide, a lipid, a lectin, an inhibitor, an activator, a ligand, a hormone, a cytokine, a sugar, an amino acid, a fatty acid, a phenol, or an alkaloid.

16. The method of claim 15, wherein dispensing the sample fluid into the microchannel further comprises:
dispensing the sample fluid from a sample chamber via a passive valve in fluid communication with the sample chamber at a first end of the microchannel.

17. The method of claim 15, further comprising:
breaking a seal between a fluid chamber configured for fluid communication with the sample chamber and the sample chamber, wherein the fluid chamber comprises a liquid selected from a wash buffer, an aqueous liquid, or a reagent.

18. The method of claim 15, wherein the sensor region comprises an array of sensing elements.

19. The method of claim 18, wherein the array is circular in shape and comprises a regular pattern of the sensing elements.

20. A microfluidic cartridge device, comprising:
a cartridge body comprising a sample chamber, a microchannel, and a reservoir;
the microchannel comprising a lumen extending from the sample chamber at a first end to the reservoir at a second end opposite the first end;
a sensor region positioned within the lumen of the microchannel; and
a squeezable bulb in fluid communication with the reservoir and with the microchannel, wherein the squeezable bulb is enabled to recirculate a fluid in the reservoir from the sensor region through the microchannel back to the sensor region.

21. The microfluidic cartridge device of claim 20, further comprising:
the microchannel formed into a winding path and configured as a flow restrictor to reduce a flow rate of the fluid.

22. The microfluidic cartridge device of claim 20, further comprising:
an array of sensor elements in the sensor region including a first sensor element, each sensor element having chemical sensitivity to at least one analyte in the fluid, and wherein the first sensing element includes at least one of: an antibody, an antibody fragment, an antigen, a protein, a nucleic acid, an oligonucleotide, a peptide, a lipid, a lectin, an inhibitor, an activator, a ligand, a hormone, a cytokine, a sugar, an amino acid, a fatty acid, a phenol, or an alkaloid.

* * * * *